US011861324B2

(12) United States Patent
Zheng et al.

(10) Patent No.: US 11,861,324 B2
(45) Date of Patent: Jan. 2, 2024

(54) METHOD, SYSTEM, AND COMPUTER PROGRAM PRODUCT FOR NORMALIZING EMBEDDINGS FOR CROSS-EMBEDDING ALIGNMENT

(71) Applicant: Visa International Service Association, San Francisco, CA (US)

(72) Inventors: Yan Zheng, Los Gatos, CA (US); Michael Yeh, Newark, CA (US); Junpeng Wang, Santa Clara, CA (US); Wei Zhang, Fremont, CA (US); Liang Wang, San Jose, CA (US); Hao Yang, San Jose, CA (US); Prince Osei Aboagye, Salt Lake City, UT (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/006,649

(22) PCT Filed: May 25, 2022

(86) PCT No.: PCT/US2022/030813
§ 371 (c)(1),
(2) Date: Jan. 24, 2023

(87) PCT Pub. No.: WO2022/251282
PCT Pub. Date: Dec. 1, 2022

(65) Prior Publication Data
US 2023/0214177 A1 Jul. 6, 2023

Related U.S. Application Data

(60) Provisional application No. 63/192,779, filed on May 25, 2021.

(51) Int. Cl.
*G06F 5/01* (2006.01)
*G06F 40/40* (2020.01)
*G06F 17/16* (2006.01)

(52) U.S. Cl.
CPC ............... *G06F 5/01* (2013.01); *G06F 17/16* (2013.01); *G06F 40/40* (2020.01)

(58) Field of Classification Search
CPC ............ G06F 5/01; G06F 17/16; G06F 40/40
(Continued)

(56) References Cited

U.S. PATENT DOCUMENTS

2018/0330729 A1  11/2018  Golipour et al.
2019/0355346 A1  11/2019  Bellegarda
(Continued)

OTHER PUBLICATIONS

Bhattacharya et al., "Deep Speaker Embeddings for Short-Duration Speaker Verification", Interspeech, 2017, pp. 1517-1521.
(Continued)

*Primary Examiner* — Tan V Mai
(74) *Attorney, Agent, or Firm* — The Webb Law Firm

(57) ABSTRACT

Provided is a method for normalizing embeddings for cross-embedding alignment. The method may include applying mean centering to the at least one embedding set, applying spectral normalization to the at least one embedding set, and/or applying length normalization to the at least one embedding set. Spectral normalization may include decomposing the at least one embedding set, determining an average singular value of the at least one embedding set, determining a respective substitute singular value for each respective singular value of a diagonal matrix, and/or replacing the at least one embedding set with a product of the at least one embedding set, a right singular vector, and an inverse of the substitute diagonal matrix. The mean centering, spectral normalization, and/or length normalization may (Continued)

be iteratively repeated for a configurable number of iterations. A system and computer program product are also disclosed.

20 Claims, 9 Drawing Sheets

(58) Field of Classification Search
USPC ........................................................ 708/205
See application file for complete search history.

(56) References Cited

U.S. PATENT DOCUMENTS

2021/0065260 A1  3/2021  Zheng et al.
2021/0109951 A1  4/2021  Yeh et al.

OTHER PUBLICATIONS

Miyato et al., "Spectral Normalization for Generative Adversarial Networks", article accessed at arXiv:1802.05957, 2018, pp. 1-26.
Agirre et al., "A Study on Similarity and Relatedness Using Distributional and WordNet-based Approaches", Proceedings of Human Language Technologies: The 2009 Annual Conference of the North American Chapter of the Association for Computational Linguistics, Jun. 2009, pp. 19-27, Association for Computational Linguistics, Boulder, Colorado.
Ahmad et al., "On Difficulties of Cross-Lingual Transfer with Order Differences: A Case Study on Dependency Parsing", Proceedings of the 2019 Conference of the North American Chapter of the Association for Computational Linguistics: Human Language Technologies, arXiv: 1811.00570v3, 2019, pp. 2440-2452, vol. 1.
Artetxe et al., "Learning principled bilingual mappings of word embeddings while preserving monolingual Invariance", Proceedings of the 2016 Conference on Empirical Methods in Natural Language Processing, Nov. 2016, pp. 2289-2294, Association for Computational Linguistics, Austin, Texas. doi: 10.18653/v1/D16-1250. Retrieved from https://www.aclweb.org/anthology/D16-1250.
Artetxe et al., "A robust self-learning method for fully unsupervised cross-lingual mappings of word embeddings", Proceedings of the 56th Annual Meeting of the Association for Computational Linguistics, arXiv:1805.06297v2, Jul. 2018, pp. 789-798, vol. 1, Association for Computational Linguistics, Melbourne, Australia. doi: 10.18653/v1/P18-1073.
Bojanowski et al., "Enriching Word Vectors with Subword Information", Transactions of the Association for Computational Linguistics, 2017, pp. 135-146, vol. 5. doi: 10.1162/tacl a 00051. Retrieved from https://www.aclweb.org/anthology/Q17-1010.
Bommasani et al., "On the Opportunities and Risks of Foundation Models", Center for Research on Foundation Models (CRFM), arXiv:2108.07258, 2021, pp. 1-214.
Bruni et al., "Distributional Semantics in Technicolor", Proceedings of the 50th Annual Meeting of the Association for Computational Linguistics, Jul. 2012, pp. 136-145, (vol. 1: Long Papers), Association for Computational Linguistics, Jeju, Republic of Korea.
Cao et al., "Unsupervised Topological Alignment for Single-Cell Multi-Omics Integration", bioRxiv, 2020, pp. 1-17. doi: 10.1101/2020.02.02.931394. Retrieved from https://www.biorxiv.org/content/early/2020/Feb. 3, 2020.02.02.931394.
Chatelon et al., "A Subgradient Algorithm for Certain Minimax and Minisum Problems", Mathematical Programming, 1978, pp. 1-39, Research Report No. 77-1.
Chen et al., "Enhanced LSTM for Natural Language Inference", Proceedings of the 55th Annual Meeting of the Association for Computational Linguistics, Jul. 2017, pp. 1657-1668, vol. 1, Association for Computational Linguistics, Vancouver, Canada. doi: 10.18653/v1/P17-1152. Retrieved from https://www.aclweb.org/anthology/P17-1152.
Chen et al., "High-throughput sequencing of the transcriptome and chromatin accessibility in the same cell", Nature Biotechnology, 2019, pp. 1452-1457, vol. 37(12).
Cheow et al., "Single-cell multimodal profiling reveals cellular epigenetic heterogeneity", Nature Methods, Aug. 2016, pp. 833-836, vol. 13 (10).
Conneau et al., "Word Translation Without Parallel Data", Published as a conference paper at ICLR, arXiv: 1710.04087v3, 2018, pp. 1-14.
Conneau et al., "XNLI: Evaluating Cross-lingual Sentence Representations", Proceedings of the 2018 Conference on Empirical Methods in Natural Language Processing, October-Nov. 2018, pp. 2475-2485, Association for Computational Linguistics, Brussels, Belgium. doi: 10.18653/v1/D18-1269. Retrieved from https://www.aclweb.org/anthology/D18-1269.
Demetci et al., "Gromov-Wasserstein optimal transport to align single-cell multi-omics data", bioRxiv, 2020, pp. 1-18.
Dev et al., "Absolute Orientation for Word Embedding Alignment", Knowledge and Information Systems, arXiv:1806.01330v2, 2021, pp. 1-19.
Dorrie, "100 Great Problems of Elementary Mathematics: Their History and Solution", 1965, pp. 1-402, Dover Publications, Inc., New York, NY.
Dubossarsky et al., "The Secret is in the Spectra: Predicting Cross-lingual Task Performance with Spectral Similarity Measures", EMNLP, arXiv:2001.11136v2, 2020, pp. 1-14.
Dyer et al., "A Simple, Fast, and Effective Reparameterization of IBM Model 2", Proceedings of the 2013 Conference of the North American Chapter of the Association for Computational Linguistics: Human Language Technologies, Jun. 2013, pp. 644-648, Association for Computational Linguistics, Atlanta, Georgia. Retrieved from https://aclanthology.org/N13-1073.
Ethayarajh, "How Contextual are Contextualized Word Representations? Comparing the Geometry of BERT, ELMo, and GPT-2 Embeddings", Proceedings of the 2019 Conference on Empirical Methods in Natural Language Processing and the 9th International Joint Conference on Natural Language Processing (EMNLP-IJCNLP), 2019, pp. 55-65.
Eyster et al., "On Solving Multifacility Location Problems using a Hyperboloid Approximation Procedure", AIIE Transactions, 1973, pp. 1-6, vol. 5(1).
Faruqui et al., "Improving Vector Space Word Representations Using Multilingual Correlation", Proceedings of the 14th Conference of the European Chapter of the Association for Computational Linguistics, Apr. 2014, pp. 462-471, Association for Computational Linguistics, Gothenburg, Sweden. doi: 10.3115/v1/E14-1049. Retrieved from https://www.aclweb.org/anthology/E14-1049.
Finkelstein et al., "Placing Search in Context: The Concept Revisited", ACM Transactions on Information Systems, Jan. 2002, pp. 116-131, vol. 20:1.
Frome et al., "DeViSE: A Deep Visual-Semantic Embedding Model", 2013, pp. 1-9.
Glavas et al., "How to (Properly) Evaluate Cross-Lingual Word Embeddings: On Strong Baselines, Comparative Analyses, and Some Misconceptions", Proceedings of the 57th Annual Meeting of the Association for Computational Linguistics, arXiv:1902.00508v1, 2019, pp. 710-721.
Gouws et al., "Fast Bilingual Distributed Representations without Word Alignments", Proceedings of the 32nd International Conference on Machine Learning, Jul. 2015, pp. 748-776, vol. 37, Lille, France. Retrieved from http://proceedings.mlr.press/v37/gouws15.html.
Grave et al., "Unsupervised Alignment of Embeddings with Wasserstein Procrustes", Proceedings of the 22nd International Conference on Artificial Intelligence and Statistics (AISTATS), 2019, pp. 1880-1890, vol. 89.
Grover et al., "node2vec: Scalable Feature Learning for Networks", Proceedings of the 22nd ACM SIGKDD International conference on Knowledge discovery and data mining, 2016, pp. 855-864.
Guo et al., "Cross-Lingual Dependency Parsing Based on Distributed Representations", Proceedings of the 53rd Annual Meeting of the Association for Computational Linguistics and the 7th International Joint Conference on Natural anguage Processing, Jul. 2015,

(56) References Cited

OTHER PUBLICATIONS pp. 1234-1244, Beijing, China, (vol. 1: Long Papers), Association for Computational Linguistics. doi: 10.3115/v1/P15-1119. Retrieved from https://www.aclweb.org/anthology/P15-1119.

Malawi et al., "Large-Scale Learning of Word Relatedness with Constraints", Proceedings of the 18th ACM SIGKDD International conference on Knowledge discovery and data mining, 2012, pp. 1406-1414.

Hartmann et al., "Comparing Unsupervised Word Translation Methods Step by Step", 33rd Conference on Neural Information Processing Systems, 2019, vol. 32, Vancouver, Canada. Retrieved from https://proceedings.neurips.cc/paper/2019/file/d15426b9c324676610fbb01360473ed8-Paper.pdf.

Hermann et al., "Multilingual Models for Compositional Distributed Semantics", Proceedings of the 52nd Annual Meeting of the Association for Computational Linguistics, Jun. 2014, pp. 58-68, (vol. 1: Long Papers), Association for Computational Linguistics, Baltimore, Maryland. doi: 10.3115/v1/P14-1006. Retrieved from https://www.aclweb.org/anthology/P14-1006.

Heyman et al., "Bilingual Lexicon Induction by Learning to Combine Word-Level and Character-Level Representations", Proceedings of the 15th Conference of the European Chapter of the Association for Computational Linguistics, Apr. 2017, pp. 1085-1095, vol. 1, Association for Computational Linguistics, Valencia, Spain. Retrieved from https://www.aclweb.org/anthology/E17-1102.

Jenkins et al., "Unsupervised Representation Learning of Spatial Data via Multimodal Embedding", Proceedings of the 28th ACM International Conference on Information and Knowledge Management, Nov. 2019, pp. 1993-2002, Association for Computing Machinery, Beijing, China.

Joulin et al., "Loss in Translation: Learning Bilingual Word Mapping with a Retrieval Criterion", Proceedings of the 2018 Conference on Empirical Methods in Natural Language Processing, arXiv: 1804.07745v3, Oct.-Nov. 2018, pp. 2979-2984, Association for Computational Linguistics, Brussels, Belgium. doi: 10.18653/v1/D18-1330.

Karan et al., "Classification-Based Self-Learning for Weakly Supervised Bilingual Lexicon Induction", Proceedings of the 58th Annual Meeting of the Association for Computational Linguistics, Jul. 2020, pp. 6915-6922, Association for Computational Linguistics. doi: 10.18653/v1/2020.acl-main.618. Retrieved from https://www.aclweb.org/anthology/2020.acl-main.618.

Kiela et al., "Learning Image Embeddings using Convolutional Neural Networks for Improved Multi-Modal Semantics" Proceedings of the 2014 Conference on empirical methods in natural language processing (EMNLP), 2014, pp. 36-45, Association for Computational Linguistics, Doha, Qatar.

Klementiev et al., "Inducing Crosslingual Distributed Representations of Words", Proceedings of COLING 2012: Technical Papers, Dec. 2012, pp. 1459-1474, COLING 2012, Mumbai, India. Retrieved from https://www.aclweb.org/anthology/C12-1089.

Lample et al., "Phrase-Based & Neural Unsupervised Machine Translation", Proceedings of the 2018 Conference on Empirical Methods in Natural Language Processing, October-Nov. 2018, pp. 5039-5049, Association for Computational Linguistics, Brussels, Belgium. doi: 10.18653/v1/D18-1549. Retrieved from https://www.aclweb.org/anthology/D18-1549.

Liu et al., "Jointly embedding multiple single-cell omics measurements", bioRxiv, 2019, pp. 1-13. doi: 10.1101/644310. Retrieved from https://www.biorxiv.org/content/early/2019/05/20/644310.

Love et al., "The Nature of Facilities Location Problems", Facilities Location: Models and Methods, 1988, pp. 7-10, Elsevier Science Publishing Co., New York, NY.

Luong et al., "Better Word Representations with Recursive Neural Networks for Morphology", Proceedings of the seventeenth conference on computational natural language learning, 2013, pp. 104-113.

Mikolov et al., "Efficient Estimation of Word Representations in Vector Space", ICLR (Workshop Poster), arXiv:1301.3781v3, 2013, pp. 1-12.

Mikolov et al., "Exploiting Similarities among Languages for Machine Translation", arXiv:1309.4168, 2013, pp. 1-10.

Mikolov et al., "Linguistic Regularities in Continuous Space Word Representations", Proceedings of the 2013 Conference of the North American Chapter of the Association for Computational Linguistics: Human Language Technologies, 2013, pp. 746-751, Association for Computational Linguistics, Atlanta, Georgia.

Miller et al., "Contextual correlates of semantic similarity", Language and Cognitive Processes, 1991, pp. 1-28, vol. 6(1).

Mu et al., "All-But-The-Top: Simple and Effective Post-Processing for Word Representations", 6th International Conference on Learning Representations, arXiv: 1702.01417v2, 2018, pp. 1-25.

Nakashole et al., "Characterizing Departures from Linearity in Word Translation", Proceedings of the 56th Annual Meeting of the Association for Computational Linguistics, 2018, pp. 221-227, vol. 2, Association for Computational Linguistics, Melbourne, Australia.

Nivre et al., "Universal Dependencies 2.2: LINDAT/CLARIAH-CZ", Digital Library at the Institute of Formal and Applied Linguistics (UFAL), Faculty of Mathematics and Physics, Charles University. Retrieved from http://hdl.handle.net/11234/1-2837.

Ormazabal et al., "Beyond Offline Mapping: Learning Cross-lingual Word Embeddings through Context Anchoring", Proceedings of the 59th annual meeting of the Association for Computational Linguistics, 2021, pp. 6479-6489, Association for Computational Linguistics.

Overton, "A Quadratically Convergent Method For Minimizing a Sum of Euclidean Norms", Mathematical Programming, 1983, pp. 34-63, vol. 27(1), North-Holland.

Patra et al. "Bliss Lexicon Induction with Semi-supervision in Non-Isometric Embedding Spaces", Proceedings of the 57th Annual Meeting of the Association for Computational Linguistics, Jul. 2018, pp. 184-193, Association for Computational Linguistics, Florence, Italy.

Pennington et al., "GloVe: Global Vectors for Word Representation", Proceedings of the 2014 Conference on Empirical Methods in Natural Language Processing (EMNLP), Oct. 2014, pp. 1532-1543, Association for Computational Linguistics, Doha, Qatar. doi: 10.3115/v1/D14-1162. Retrieved from https://www.aclweb.org/anthology/D14-1162.

Perozzi et al., "DeepWalk: Online Learning of Social Representations", Proceedings of the 20th ACM SIGKDD International conference on Knowledge discovery and data mining, 2014, pp. 701-710, New York, NY.

Radinsky et al., "A Word at a Time: Computing Word Relatedness using Temporal Semantic Analysis", Proceedings of the 20th International Conference on World Wide Web, 2011, pp. 337-346, Hyderabad, India.

Rubenstein et al., "Computational Linguistics: Contextual Correlates of Synonymy", Communications of the ACM, 1965, pp. 627-633, vol. 8(10).

Ruder et al., "A Discriminative Latent-Variable Model for Bilingual Lexicon Induction", Proceedings of the 2018 Conference on Empirical Methods in Natural Language Processing, arXiv:1808.09334v2, Oct.-Nov. 2018, pp. 458-468, Association for Computational Linguistics, Brussels, Belgium. doi: 10.18653/v1/D18-1042.

Ruder et al., "A Survey of Cross-lingual Word Embedding Models", Journal of Artificial Intelligence Research, 2019, pp. 569-631, vol. 65.

Ruder et al., "Unsupervised Cross-Lingual Representation Learning", Proceedings of the 57th Annual Meeting of the Association for Computational Linguistics: Tutorial Abstracts, Jul. 2019, pp. 31-38, Association for Computational Linguistics, Florence, Italy.

Sachidanada et al., "Filtered Inner Product Projection for Crosslingual Embedding Alignment", ICLR 2021: The 9th International Conference on Learning Representations, arXiv:2006.03652v2, 2021, pp. 1-26.

Safaya et al., "Kuisail at SemEval-2020 Task 12: BERT-CNN for Offensive Speech Identification in Social Media", Proceedings of the 14th International Workshop on Semantic Evaluation, Dec. 2020, pp. 2054-2059, Barcelona, Spain.

(56) References Cited

OTHER PUBLICATIONS

Smith et al., "Offline Bilingual Word Vectors, Orthogonal Transformations and the Inverted Softmax", ICLR (Poster), arXiv:1702.03859v1, 2017, pp. 1-10.

Sogaard et al., "On the Limitations of Unsupervised Bilingual Dictionary Induction", Proceedings of the 56th Annual Meeting of the Association for Computational Linguistics, Jul. 2018, pp. 778-788, (vol. 1: Long Papers), Association for Computational Linguistics, Melbourne, Australia. doi: 10.18653/v1/P18-1072. Retrieved from https://aclanthology.org/P18-1072.

Vardi et al., "The multivariate l1-median and associated data depth", Proceedings of the National Academy of Sciences, 2000, pp. 1423-1426, vol. 97(4).

Vulic et al., "Monolingual and Cross-Lingual Information Retrieval Models Based on (Bilingual) Word Embeddings", Proceedings of the 38th International Acm Sigir Conference on Research and Development in Information Retrieval, 2015, pp. 363-372, Santiago, Chile.

Vulic et al., "Do We Really Need Fully Unsupervised Cross-Lingual Embeddings?", Proceedings of the 2019 Conference on Empirical Methods in Natural Language Processing and the 9th International Joint Conference on Natural Language Processing (EMNLP-IJCNLP), arXiv:1909.01638v1, 2019, pp. 4406-4417.

Wang et al., "Constrained Non-Affine Alignment of Embeddings", Proceedings of the International Conference on Data Mining (ICDM), arXiv: 1910.05862v4, 2021, pp. 1-9.

Wang et al., "Cross-Lingual Alignment vs Joint Training: A Comparative Study and A Simple Unified Framework", Published as a conference paper at ICLR, arXiv:19010.04708v4, 2020. Retrieved from http://arxiv.org/abs/1910.04708.

Williams et al., "A Broad-Coverage Challenge Corpus for Sentence Understanding through Inference", Proceedings of the 2018 Conference of the North American Chapter of the Association for Computational Linguistics: Human Language Technologies, Jun. 2018, pp. 1112-1122, vol. 1 (Long Papers), Association for Computational Linguistics, New Orleans, Louisiana. doi: 10.18653/v1/N18-1101. Retrieved from https://www.aclweb.org/anthology/N18-1101.

Wolf et al., "Transformers: State-of-the-Art Natural Language Processing", arXiv:1910.03771, 2019, pp. 1-8.

Xing et al., "Normalized Word Embedding and Orthogonal Transform for Bilingual Word Translation", Human anguage Technologies: The 2015 Annual Conference of the North American Chapter of the ACL, May-Jun. 2015, pp. 1006-1011, Association for Computational Linguistics, Denver, Colorado. doi: 10.3115/v1/N15-1104. Retrieved from https://www.aclweb.org/anthology/N15-1104.

Xu et al., "Cross-Lingual BERT Contextual Embedding Space Mapping with Isotropic and Isometric Conditions", arXiv:2107.09186, 2021, pp. 1-10.

Yang et al., "Verb Similarity on the Taxonomy of WordNet", Proceedings of the Third International WorldNet Conference GWC, 2006, pp. 121-128, South Jeju Island, Korea, Masaryk University.

Zhang et al., "Are Girls Neko or Shojo? Cross-Lingual Alignment of Non-Isomorphic Embeddings with Iterative Normalization", Proceedings of the 57th Annual Meeting of the Association for Computational Linguistics, Jul. 2019, pp. 3180-3189, Association for Computational Linguistics, Florence, Italy. doi: 10.18653/v1/P19-1307. Retrieved from https://www.aclweb.org/anthology/P19-1307.

METHOD, SYSTEM, AND COMPUTER PROGRAM PRODUCT FOR NORMALIZING EMBEDDINGS FOR CROSS-EMBEDDING ALIGNMENT

CROSS REFERENCE TO RELATED APPLICATIONS

This application is the United States national phase of International Application No. PCT/US2022/030813 filed May 25, 2022, and claims priority to U.S. Provisional Patent Application No. 63/192,779, filed May 25, 2021, the disclosures of which are hereby incorporated by reference in their entirety.

BACKGROUND

1. Technical Field

This disclosed subject matter relates generally to methods, systems, and computer program products for normalizing embeddings and, in some particular embodiments or aspects, to a method, system, and computer program product for normalizing embeddings for cross-embedding alignment.

2. Technical Considerations

Cross-embedding alignment (e.g., aligning embedding vectors from two or more different embedding spaces) can be useful in various applications. For example, cross-lingual and multilingual natural language processing (NLP) has gained attention recently. Learning a transfer function to map word embedding vectors from multiple languages into a shared cross-lingual word embedding vector space enables multilingual modeling of the meaning of words and cross-lingual transfer of NLP models. Cross-lingual word embeddings (CLWEs) represent words from two or more languages in a shared cross-lingual vector space, and CLWEs serve as a valuable tool for transferring data across different languages, understanding cross-linguistic differences, and cross-lingual transfer for downstream tasks, such as bilingual lexicon induction (BLI), cross-lingual information retrieval, cross-lingual document classification, cross-lingual dependency parsing, and machine translation. Certain CLWE techniques use a rigid, orthogonal transformation mapping one embedding onto another so the embeddings inhabit a shared linguistic space. For example, a Procrustes alignment technique provides a closed form solution which minimizes the sum of all pairs of Euclidean distances for an alignment between pairs of objects across two embeddings. Preprocessing of embedding vectors before applying an alignment technique (e.g., Procrustes alignment and/or the like) can improve CLWE performance.

However, limitations of certain preprocessing techniques lead to reduced (e.g., poor, suboptimal, and/or the like) performance. For example, mean centering does not change the Euclidean distance between any pair of points in a set of embedding vectors, but does change the cosine distance between pairs of points. Length normalization does not change the cosine distance between any pair of points in a set of embedding vector, but it does change the Euclidean distance between pairs of points. Principle component analysis (PCA) removal reduces the top principal component or top singular vector (e.g., makes the top singular value exactly 0), and thus, PCA may be overly blunt.

SUMMARY

Accordingly, provided are improved methods, systems, and computer program products for normalizing embeddings for cross-embedding alignment.

According to non-limiting embodiments or aspects, provided is a method for normalizing embeddings for cross-embedding alignment. In some non-limiting embodiments or aspects, a method for normalizing embeddings for cross-embedding alignment may include receiving at least one embedding set, each embedding set of the at least one embedding set comprising a set of embedding vectors. Mean centering may be applied to the at least one embedding set. Spectral normalization may be applied to the at least one embedding set. For example, spectral normalization may include decomposing the at least one embedding set to provide a left singular vector, a right singular vector, and a diagonal matrix; determining an average singular value of the at least one embedding set; for each respective singular value of the diagonal matrix, determining whether the respective singular value is greater than a configurable multiple of the average singular value; for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and replacing the at least one embedding set with a product of the at least one embedding set, the right singular vector, and an inverse of the substitute diagonal matrix. Length normalization may be applied to the at least one embedding set.

In some non-limiting embodiments or aspects, applying mean centering may include determining a mean based on all embedding vectors of the set of embedding vectors. Additionally or alternatively, the mean may be subtracted from each embedding vector of the set of embedding vectors.

In some non-limiting embodiments or aspects, decomposing the at least one embedding set may include performing singular value decomposition on the at least one embedding set.

In some non-limiting embodiments or aspects, determining the average singular value may include determining a square root of an average squared singular value.

In some non-limiting embodiments or aspects, applying length normalization may include adjusting each embedding vector of the set of embedding vectors to have a 2-norm of 1.

In some non-limiting embodiments or aspects, applying mean centering, applying spectral normalization, and applying length normalization to the at least one embedding set may be iteratively repeated for a configurable number of iterations.

In some non-limiting embodiments or aspects, the at least one embedding set may include a first embedding set and a second embedding set. Additionally or alternatively, the first embedding set may be aligned with the second embedding set.

In some non-limiting embodiments or aspects, the at least one embedding set may include a first language embedding set and a second language embedding set. The first language embedding set may include a first set of word embedding vectors for a first language. The second language embedding set may include a second set of word embedding vectors for a second language.

In some non-limiting embodiments or aspects, the at least one embedding set may include a first embedding set representing an entity in a first embedding space associated with a first time period and a second embedding set representing the entity in a second embedding space associated with a second time period different than the first time period.

In some non-limiting embodiments or aspects, the entity may include at least one of a merchant, a customer, an issuer, an acquirer, or a payment gateway.

According to non-limiting embodiments or aspects, provided is a system for normalizing embeddings for cross-embedding alignment. In some non-limiting embodiments or aspects, the system for normalizing embeddings for cross-embedding alignment may include at least one processor and at least one non-transitory computer-readable medium including one or more instructions that, when executed by the at least one processor, direct the at least one processor to receive at least one embedding set. Each embedding set of the at least one embedding set may include a set of embedding vectors. The instructions, when executed by the at least one processor, may further direct the at least one processor to apply mean centering to the at least one embedding set. The instructions, when executed by the at least one processor, may further direct the at least one processor to apply spectral normalization to the at least one embedding set. Applying spectral normalization to the at least one embedding set may include decomposing the at least one embedding set to provide a left singular vector, a right singular vector, and a diagonal matrix; determining an average singular value of the at least one embedding set; for each respective singular value of the diagonal matrix, determining whether the respective singular value is greater than a configurable multiple of the average singular value; for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and/or replacing the at least one embedding set with a product of the at least one embedding set, the right singular vector, and an inverse of the substitute diagonal matrix. The instructions, when executed by the at least one processor, may further direct the at least one processor to apply length normalization to the at least one embedding set.

In some non-limiting embodiments or aspects, applying mean centering may include determining a mean based on all embedding vectors of the set of embedding vectors and/or subtracting the mean from each embedding vector of the set of embedding vectors.

In some non-limiting embodiments or aspects, decomposing the at least one embedding set may include performing singular value decomposition on the at least one embedding set.

In some non-limiting embodiments or aspects, determining the average singular value may include determining a square root of an average squared singular value.

In some non-limiting embodiments or aspects, applying length normalization may include adjusting each embedding vector of the set of embedding vectors to have a 2-norm of 1.

In some non-limiting embodiments or aspects, the instructions, when executed by the at least one processor, may further direct the at least one processor to iteratively repeat applying mean centering, applying spectral normalization, and applying length normalization to the at least one embedding set for a configurable number of iterations.

In some non-limiting embodiments or aspects, the at least one embedding set may include a first embedding set and a second embedding set. Additionally or alternatively, the instructions, when executed by the at least one processor, may further direct the at least one processor to align the first embedding set with the second embedding set.

In some non-limiting embodiments or aspects, the at least one embedding set may include a first language embedding set and a second language embedding set. The first language embedding set may include a first set of word embedding vectors for a first language. The second language embedding set may include a second set of word embedding vectors for a second language.

In some non-limiting embodiments or aspects, the at least one embedding set may include a first embedding set representing an entity in a first embedding space associated with a first time period and a second embedding set representing the entity in a second embedding space associated with a second time period different than the first time period.

In some non-limiting embodiments or aspects, the entity may include at least one of a merchant, a customer, an issuer, an acquirer, or a payment gateway.

According to non-limiting embodiments or aspects, provided is a computer program product for normalizing embeddings for cross-embedding alignment. The computer program product may include at least one non-transitory computer-readable medium including one or more instructions that, when executed by at least one processor, cause the at least one processor to receive at least one embedding set. Each embedding set of the at least one embedding set may include a set of embedding vectors. The instructions, when executed by the at least one processor, may further cause the at least one processor to apply mean centering to the at least one embedding set. The instructions, when executed by the at least one processor, may further cause the at least one processor to apply spectral normalization to the at least one embedding set. Applying spectral normalization to the at least one embedding set may include decomposing the at least one embedding set to provide a left singular vector, a right singular vector, and a diagonal matrix; determining an average singular value of the at least one embedding set; for each respective singular value of the diagonal matrix, determining whether the respective singular value is greater than a configurable multiple of the average singular value; for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and/or replacing the at least one embedding set with a product of the at least one embedding set, the right singular vector, and an inverse of the substitute diagonal matrix. The instructions, when executed by the at least one processor, may further cause the at least one processor to apply length normalization to the at least one embedding set.

In some non-limiting embodiments or aspects, applying mean centering may include determining a mean based on all embedding vectors of the set of embedding vectors and/or subtracting the mean from each embedding vector of the set of embedding vectors.

In some non-limiting embodiments or aspects, decomposing the at least one embedding set may include performing singular value decomposition on the at least one embedding set.

In some non-limiting embodiments or aspects, determining the average singular value may include determining a square root of an average squared singular value.

In some non-limiting embodiments or aspects, applying length normalization may include adjusting each embedding vector of the set of embedding vectors to have a 2-norm of 1.

In some non-limiting embodiments or aspects, the instructions, when executed by the at least one processor, may further cause the at least one processor to iteratively repeat applying mean centering, applying spectral normalization, and applying length normalization to the at least one embedding set for a configurable number of iterations.

In some non-limiting embodiments or aspects, the at least one embedding set may include a first embedding set and a second embedding set. Additionally or alternatively, the instructions, when executed by the at least one processor, may further cause the at least one processor to align the first embedding set with the second embedding set.

In some non-limiting embodiments or aspects, the at least one embedding set may include a first language embedding set and a second language embedding set. The first language embedding set may include a first set of word embedding vectors for a first language. The second language embedding set may include a second set of word embedding vectors for a second language.

In some non-limiting embodiments or aspects, the at least one embedding set may include a first embedding set representing an entity in a first embedding space associated with a first time period and a second embedding set representing the entity in a second embedding space associated with a second time period different than the first time period.

In some non-limiting embodiments or aspects, the entity may include at least one of a merchant, a customer, an issuer, an acquirer, or a payment gateway.

Further non-limiting embodiments or aspects are set forth in the following numbered clauses:

Clause 1: A computer-implemented method, comprising: receiving, with at least one processor, at least one embedding set, each embedding set of the at least one embedding set comprising a set of embedding vectors; applying, with at least one processor, mean centering to the at least one embedding set; applying, with at least one processor, spectral normalization to the at least one embedding set, wherein applying spectral normalization to the at least one embedding set comprises: decomposing, with at least one processor, the at least one embedding set to provide a left singular vector, a right singular vector, and a diagonal matrix; determining, with at least one processor, an average singular value of the at least one embedding set; for each respective singular value of the diagonal matrix, determining, with at least one processor, whether the respective singular value is greater than a configurable multiple of the average singular value; for each respective singular value of the diagonal matrix, if the respective singular value is greater than the configurable multiple of the average singular value, determining, with at least one processor, a respective substitute singular value based on a quotient of the respective singular value divided by the configurable multiple of the average singular value, or, if the respective singular value is not greater than the configurable multiple of the average singular value, determining, with at least one processor, the respective substitute singular value to be 1, wherein a substitute diagonal matrix comprises the respective substitute singular value for each respective singular value of the diagonal matrix; and replacing, with at least one processor, the at least one embedding set with a product of the at least one embedding set, the right singular vector, and an inverse of the substitute diagonal matrix; and applying, with at least one processor, length normalization to the at least one embedding set.

Clause 2: The method of clause 1, wherein applying mean centering comprises: determining, with at least one processor, a mean based on all embedding vectors of the set of embedding vectors; and subtracting, with at least one processor, the mean from each embedding vector of the set of embedding vectors.

Clause 3: The method of clause 1 or clause 2, wherein decomposing the at least one embedding set comprises performing singular value decomposition on the at least one embedding set.

Clause 4: The method of any of clauses 1-3, wherein determining the average singular value comprises determining a square root of an average squared singular value.

Clause 5: The method of any of clauses 1-4, wherein applying length normalization comprises: adjusting, with at least one processor, each embedding vector of the set of embedding vectors to have a 2-norm of 1.

Clause 6: The method of any of clauses 1-5, further comprising: iteratively repeating, with at least one processor, applying mean centering, applying spectral normalization, and applying length normalization to the at least one embedding set for a configurable number of iterations.

Clause 7: The method of any of clauses 1-6, wherein the at least one embedding set comprises a first embedding set and a second embedding set, the method further comprising: aligning, with at least one processor, the first embedding set with the second embedding set.

Clause 8: The method of any of clauses 1-7, wherein the at least one embedding set comprises a first language embedding set and a second language embedding set, the first language embedding set comprising a first set of word embedding vectors for a first language, the second language embedding set comprising a second set of word embedding vectors for a second language.

Clause 9: The method of any of clauses 1-8, wherein the at least one embedding set comprises a first embedding set representing an entity in a first embedding space associated with a first time period and a second embedding set representing the entity in a second embedding space associated with a second time period different than the first time period.

Clause 10: The method of any of clauses 1-9, wherein the entity comprises at least one of a merchant, a customer, an issuer, an acquirer, or a payment gateway.

Clause 11: A system, comprising: at least one processor; and at least one non-transitory computer-readable medium including one or more instructions that, when executed by the at least one processor, direct the at least one processor to: receive at least one embedding set, each embedding set of the at least one embedding set comprising a set of embedding vectors; apply mean centering to the at least one embedding set; apply spectral normalization to the at least one embedding set, wherein applying spectral normalization to the at least one embedding set comprises: decomposing the at least one embedding set to provide a left singular vector, a right singular vector, and a diagonal matrix; determining an average singular value of the at least one embedding set; for each respective singular value of the diagonal matrix, determining whether the respective singular value is greater than a configurable multiple of the average singular value; for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and replacing the at least one embedding set with a product of the at least one embedding set, the right singular vector, and an inverse of the substitute diagonal matrix; and apply length normalization to the at least one embedding set.

Clause 12: The system of clause 11, wherein applying mean centering comprises: determining a mean based on all embedding vectors of the set of embedding vectors; and subtracting the mean from each embedding vector of the set of embedding vectors.

Clause 13: The system of clause 11 or clause 12, wherein decomposing the at least one embedding set comprises performing singular value decomposition on the at least one embedding set.

Clause 14: The system of any of clauses 11-13, wherein determining the average singular value comprises determining a square root of an average squared singular value.

Clause 15: The system of any of clauses 11-14, wherein applying length normalization comprises: adjusting each embedding vector of the set of embedding vectors to have a 2-norm of 1.

Clause 16: The system of any of clauses 11-15, wherein the instructions, when executed by the at least one processor, further direct the at least one processor to: iteratively repeat applying mean centering, applying spectral normalization, and applying length normalization to the at least one embedding set for a configurable number of iterations.

Clause 17: The system of any of clauses 11-16, wherein the at least one embedding set comprises a first embedding set and a second embedding set, wherein the instructions, when executed by the at least one processor, further direct the at least one processor to: align the first embedding set with the second embedding set.

Clause 18: The system of any of clauses 11-17, wherein the at least one embedding set comprises a first language embedding set and a second language embedding set, the first language embedding set comprising a first set of word embedding vectors for a first language, the second language embedding set comprising a second set of word embedding vectors for a second language.

Clause 19: The system of any of clauses 11-18, wherein the at least one embedding set comprises a first embedding set representing an entity in a first embedding space associated with a first time period and a second embedding set representing the entity in a second embedding space associated with a second time period different than the first time period, and wherein the entity comprises at least one of a merchant, a customer, an issuer, an acquirer, or a payment gateway.

Clause 20: A computer program product comprising at least one non-transitory computer-readable medium including one or more instructions that, when executed by at least one processor, cause the at least one processor to: receive at least one embedding set, each embedding set of the at least one embedding set comprising a set of embedding vectors; apply mean centering to the at least one embedding set; apply spectral normalization to the at least one embedding set, wherein applying spectral normalization to the at least one embedding set comprises: decomposing the at least one embedding set to provide a left singular vector, a right singular vector, and a diagonal matrix; determining an average singular value of the at least one embedding set; for each respective singular value of the diagonal matrix, determining whether the respective singular value is greater than a configurable multiple of the average singular value; for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and replacing the at least one embedding set with a product of the at least one embedding set, the right singular vector, and an inverse of the substitute diagonal matrix; and apply length normalization to the at least one embedding set.

Clause 21: The computer program product of clause 20, wherein applying mean centering comprises: determining a mean based on all embedding vectors of the set of embedding vectors; and subtracting the mean from each embedding vector of the set of embedding vectors.

Clause 22: The computer program product of clause 20 or clause 21, wherein decomposing the at least one embedding set comprises performing singular value decomposition on the at least one embedding set.

Clause 23: The computer program product of any of clauses 20-22, wherein determining the average singular value comprises determining a square root of an average squared singular value.

Clause 24: The computer program product of any of clauses 20-23, wherein applying length normalization comprises: adjusting each embedding vector of the set of embedding vectors to have a 2-norm of 1.

Clause 25: The computer program product of any of clauses 20-24, wherein the instructions, when executed by the at least one processor, further cause the at least one processor to: iteratively repeat applying mean centering, applying spectral normalization, and applying length normalization to the at least one embedding set for a configurable number of iterations.

Clause 26: The computer program product of any of clauses 20-25, wherein the at least one embedding set comprises a first embedding set and a second embedding set, wherein the instructions, when executed by the at least one processor, further cause the at least one processor to: align the first embedding set with the second embedding set.

Clause 27: The computer program product of any of clauses 20-26, wherein the at least one embedding set comprises a first language embedding set and a second language embedding set, the first language embedding set comprising a first set of word embedding vectors for a first language, the second language embedding set comprising a second set of word embedding vectors for a second language.

Clause 28: The computer program product of any of clauses 20-27, wherein the at least one embedding set comprises a first embedding set representing an entity in a first embedding space associated with a first time period and a second embedding set representing the entity in a second embedding space associated with a second time period different than the first time period.

Clause 29: The computer program product of any of clauses 20-28, wherein the entity comprises at least one of a merchant, a customer, an issuer, an acquirer, or a payment gateway.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DETAILED DESCRIPTION

Figure 1A:
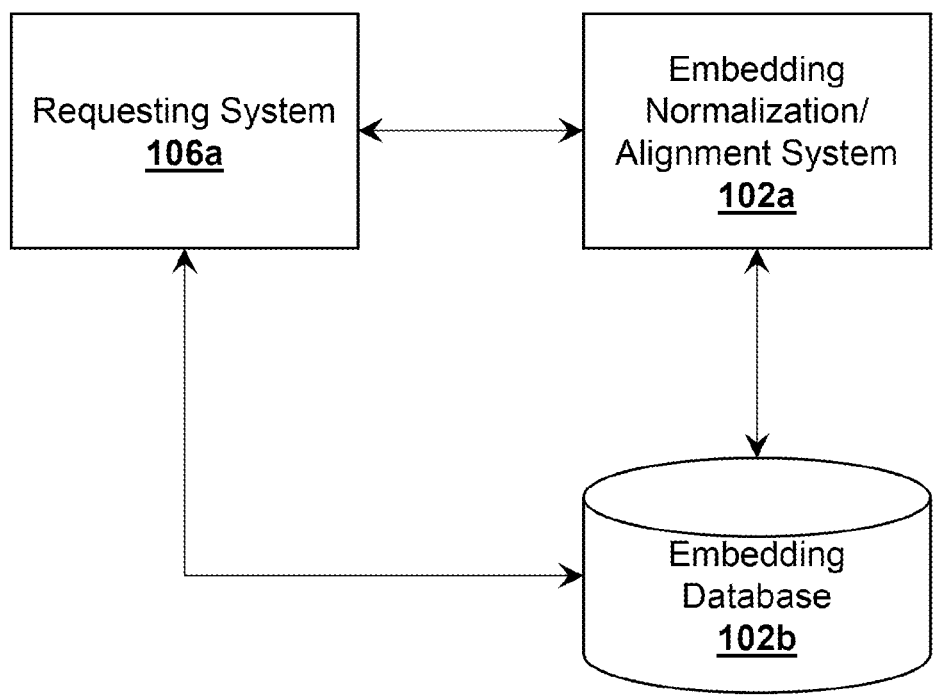
FIG. 1A is a diagram of an exemplary system for normalizing embeddings for cross-embedding alignment, according to some non-limiting embodiments or aspects of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "computing device" may refer to one or more electronic devices that are configured to directly or indirectly communicate with or over one or more networks. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and/or processing in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a POS system of a merchant.

The term "processor," as used herein, may represent any type of processing unit, such as a single processor having one or more cores, one or more cores of one or more processors, multiple processors each having one or more cores, and/or other arrangements and combinations of processing units.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for normalizing embeddings, including, but not limited to, normalizing embeddings for cross-embedding alignment. For example, non-limiting embodiments or aspects of the disclosed subject matter provide a new preprocessing technique: spectral normalization. Spectral normalization may include decomposing an embedding set to provide a left singular vector, a right singular vector, and a diagonal matrix, determining an average singular value of the at least one embedding set, determining a respective substitute singular value for each respective singular value of the diagonal matrix based on configurable (e.g., tunable) hyperparameters, and replacing the embedding set based on the substitute diagonal matrix. Additionally, non-limiting embodiments or aspects of the disclosed subject matter enable mean centering, spectral normalization, and length normalization to be iteratively applied based on configurable (e.g., tunable) hyperparameters. Such embodiments provide techniques and systems that provide improved performance (e.g., increased F1-score) for cross-embedding alignment and downstream tasks (e.g., bilingual lexicon induction (BLI), cross-lingual document classification (CLDC), and/or the like). Additionally or alternatively, such embodiments provide techniques and systems that provide preprocessing for embedding sets that improves spectral properties, including decreased condition number, increased numeric rank, and decreased joint condition number. Additionally or alternatively, such embodiments provide techniques and systems that allow for gently adjusting the spectral properties of an embedding set (e.g., without bluntly removing singular values and/or forcing metrics such as condition number to infinity). Additionally or alternatively, such embodiments provide techniques and systems that enable preprocessing of embedding sets that is agnostic to the method of alignment used afterwards, and therefore can be applied in combination with any alignment method. Additionally or alternatively, such embodiments provide techniques and systems that can be applied to embedding sets in a variety of contexts, including cross-lingual alignment, mapping between embeddings representing the same entity in two different time periods (e.g., because the embedding space would be different because of different data between the two time periods), merchant classification, fraud detection, restaurant recommendation, product recommendation, and/or the like.

For the purpose of illustration, in the following description, while the presently disclosed subject matter is described with respect to methods, systems, and computer program products for normalizing word embeddings, e.g., for cross-lingual alignment, one skilled in the art will recognize that the disclosed subject matter is not limited to the illustrative embodiments or aspects. For example, the methods, systems, and computer program products described herein may be used with a wide variety of settings, such as normalizing embeddings in any setting suitable for using such embeddings, e.g., mapping between embeddings representing the same entity in two different time periods (e.g., because the embedding space would be different because of different data between the two time periods), merchant classification, fraud detection, restaurant recommendation, product recommendation, and/or the like.

Referring now to FIG. 1A, FIG. 1A is a diagram of an exemplary system 100a for normalizing embeddings for cross-embedding alignment, according to some non-limiting embodiments or aspects. As shown in FIG. 1A, system 100a includes embedding normalization/alignment system 102a, embedding database 102b, and/or requesting system 106a.

Embedding normalization/alignment system 102a may include one or more devices capable of receiving information from and/or communicating information to embedding database 102b and/or requesting system 106a. For example, embedding normalization/alignment system 102a may include a computing device, such as a server, a group of servers, and/or other like devices. In some non-limiting embodiments or aspects, embedding normalization/alignment system 102a may be in communication with a data storage device (e.g., embedding database 102b, another data storage device separate from embedding database 102b, any combination thereof, and/or the like), which may be local or remote to embedding normalization/alignment system 102a. In some non-limiting embodiments or aspects, embedding normalization/alignment system 102a may be capable of receiving information from, storing information in, communicating information to, or searching information stored in the data storage device.

Embedding database 102b may include one or more devices capable of receiving information from and/or communicating information to embedding normalization/alignment system 102a and/or requesting system 106a. For example, embedding database 102b may include a computing device, such as a server, a group of servers, and/or other like devices. In some non-limiting embodiments or aspects, embedding database 102b may include a data storage device. In some non-limiting embodiments or aspects, embedding database 102b may be part of the same system as embedding normalization/alignment system 102a (e.g., embedding database 102b may be part of embedding normalization/alignment system 102a, part of another system that also includes embedding normalization/alignment system 102a, and/or the like). In some non-limiting embodiments or aspects, embedding database 102b may be separate from embedding normalization/alignment system 102a.

Requesting system 106a may include one or more devices capable of receiving information from and/or communicating information to embedding normalization/alignment system 102a and/or embedding database 102b. For example, requesting system 106a may include a computing device, such as a computer, a portable computer, a mobile device, a client device, a server, a group of servers, and/or the like. In some non-limiting embodiments or aspects, requesting system 106a may be part of the same system as embedding normalization/alignment system 102a (e.g., requesting system 106a may be part of embedding normalization/alignment system 102a, part of another system that also includes embedding normalization/alignment system 102a, and/or the like). In some non-limiting embodiments or aspects, requesting system 106a may be separate from embedding normalization/alignment system 102a. In some non-limiting embodiments or aspects, requesting system 106a may be part of the same system as embedding database 102b (e.g., requesting system 106a may be part of embedding normalization/alignment system 102a that also includes embedding database 102b, part of another system that includes requesting system 106a and embedding database 102b, and/or the like). In some non-limiting embodiments or aspects, requesting system 106a may be separate from embedding normalization/alignment system 102a.

The number and arrangement of systems and/or devices shown in FIG. 1A are provided as an example. There may be additional systems and/or devices; fewer systems and/or devices; different systems and/or devices; and/or differently arranged systems and/or devices than those shown in FIG. 1A. Furthermore, two or more systems or devices shown in FIG. 1A may be implemented within a single system or device, or a single system or device shown in FIG. 1A may be implemented as multiple, distributed systems or devices. Additionally or alternatively, a set of systems (e.g., one or more systems) or a set of devices (e.g., one or more devices) of system 100a may perform one or more functions described as being performed by another set of systems or another set of devices of system 100a.

Figure 1B:
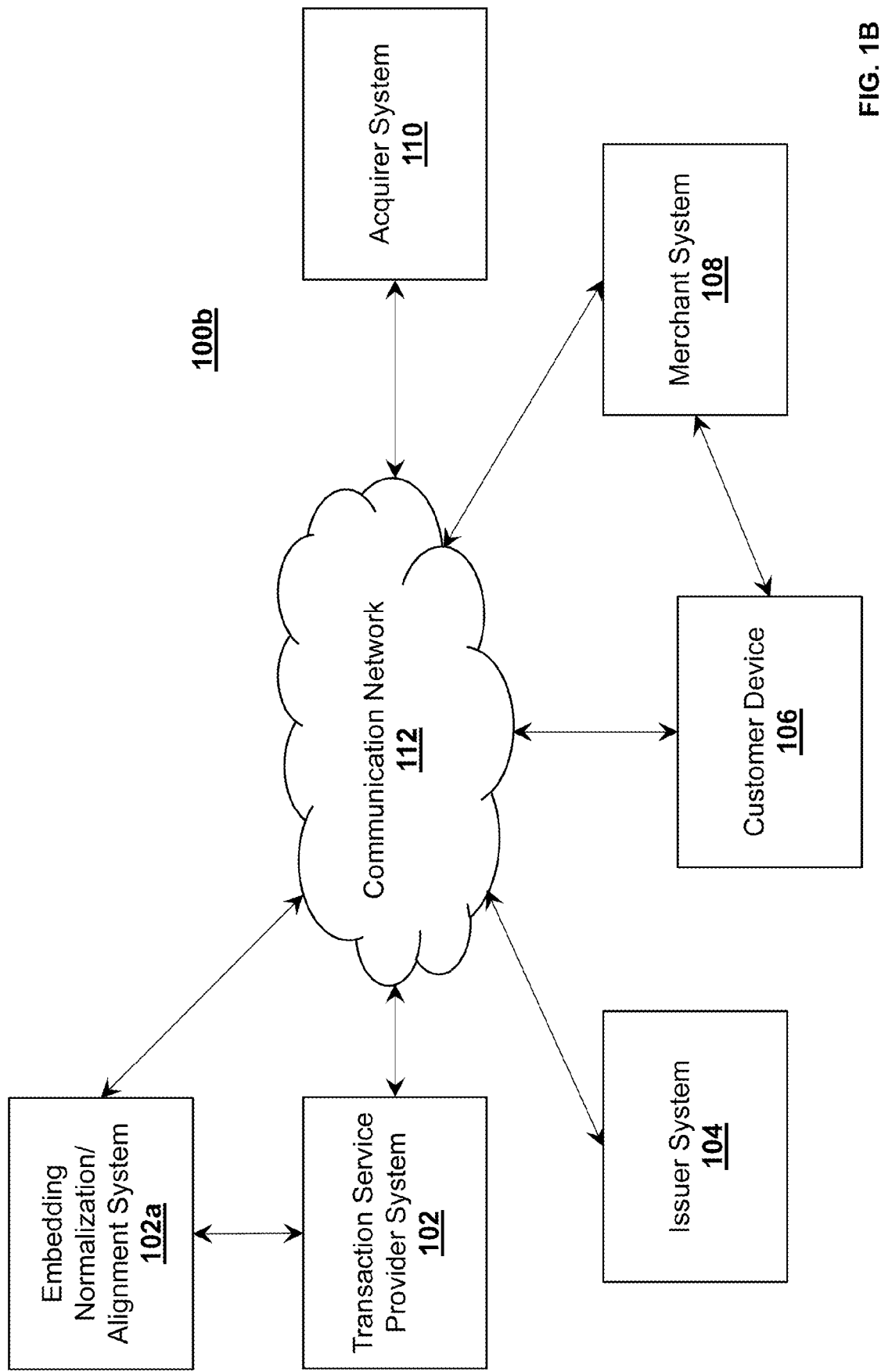
FIG. 1B is a diagram of an exemplary environment in which methods, systems, and/or computer program products described herein may be implemented, according to some non-limiting embodiments or aspects of the presently disclosed subject matter.

Referring now to FIG. 1B, FIG. 1B is an exemplary environment 100b in which methods, systems, and/or computer program products, as described herein, may be implemented, according to some non-limiting embodiments or aspects. As shown in FIG. 1B, environment 100b includes transaction service provider system 102, embedding normalization/alignment system 102a, issuer system 104, customer device 106, merchant system 108, acquirer system 110, and/or communication network 112.

In some non-limiting embodiments or aspects, embedding normalization/alignment system 102a may be the same as or similar to the description above in reference to FIG. 1A. Additionally or alternatively, embedding normalization/alignment system 102a may be capable of receiving information from and/or communicating information to transaction service provider system 102, issuer system 104, customer device 106, merchant system 108, and/or acquirer system 110 (e.g., via communication network 112). In some non-limiting embodiments or aspects, embedding normalization/alignment system 102a may be part of the same system as transaction service provider system 102 (e.g., embedding normalization/alignment system 102a may be part of transaction service provider system 102, part of another system that also includes transaction service provider system 102, and/or the like). In some non-limiting embodiments or aspects, embedding database 102*b*, as described above in reference to FIG. 1A, may be part of the same system as embedding normalization/alignment system 102*a* (e.g., embedding database 102*b* may be part of embedding normalization/alignment system 102*a*, part of another system (such as transaction service provider system 102) that also includes embedding normalization/alignment system 102*a*, and/or the like). In some non-limiting embodiments or aspects, requesting system 106*a*, as described above in reference to FIG. 1A, may be part of the same system as embedding normalization/alignment system 102*a* (e.g., embedding database 102*b* may be part of embedding normalization/alignment system 102*a*, part of another system (such as transaction service provider system 102) that also includes embedding normalization/alignment system 102*a*, and/or the like). In some non-limiting embodiments or aspects, requesting system 106*a*, as described above in reference to FIG. 1A, may be the same as, similar to, and/or part of another system, another device, another group of systems, or another group of devices, separate from or including embedding normalization/alignment system 102*a*, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like.

Transaction service provider system 102 may include one or more devices capable of receiving information from and/or communicating information to embedding normalization/alignment system 102*a*, issuer system 104, customer device 106, merchant system 108, and/or acquirer system 110 via communication network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, embedding normalization/alignment system 102*a*, customer device 106, merchant system 108, and/or acquirer system 110 via communication network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, embedding normalization/alignment system 102*a*, issuer system 104, merchant system 108, and/or acquirer system 110 via communication network 112. Additionally or alternatively, each customer device 106 may include a device capable of receiving information from and/or communicating information to other customer devices 106 via communication network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, embedding normalization/alignment system 102*a*, issuer system 104, customer device 106, and/or acquirer system 110 via communication network 112. Merchant system 108 may also include a device capable of receiving information from customer device 106 via communication network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via communication network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, embedding normalization/alignment system 102*a*, issuer system 104, customer device 106, and/or merchant system 108 via communication network 112. For example, acquirer system 110 may include a computing device, a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least on device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereon. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 106 and/or the like) and/or transaction data associated with the transaction. For example, merchant system 108 (e.g., a client device of merchant system 108, a POS device of merchant system 108, and/or the like) may initiate the transaction, e.g., by generating an authorization request (e.g., in response to receiving the account identifier from a portable financial device of the customer and/or the like). Additionally or alternatively, merchant system 108 may communicate the authorization request to acquirer system 110. Additionally or alternatively, acquirer system 110 may communicate the authorization request to transaction service provider system 102. Additionally or alternatively, transaction service provider system 102 may communicate the authorization request to issuer system 104. Issuer system 104 may determine an authorization decision (e.g., authorize, decline, and/or the like) based on the authorization request, and/or issuer system 104 may generate an authorization response based on the authorization decision and/or the authorization request. Additionally or alternatively, issuer system 104 may communicate the authorization response to transaction service provider system 102. Additionally or alternatively, transaction service provider system 102 may communicate the authorization response to acquirer system 110, which may communicate the authorization response to merchant system 108.

For the purpose of illustration, clearing and/or settlement of a transaction may include generating a message (e.g., clearing message, settlement message, and/or the like) based on an account identifier of a customer (e.g., associated with customer device 106 and/or the like) and/or transaction data associated with the transaction. For example, merchant system 108 may generate at least one clearing message (e.g., a plurality of clearing messages, a batch of clearing messages, and/or the like). Additionally or alternatively, merchant system 108 may communicate the clearing message(s) to acquirer system 110. Additionally or alternatively, acquirer system 110 may communicate the clearing message(s) to transaction service provider system 102. Additionally or alternatively, transaction service provider system 102 may communicate the clearing message(s) to issuer system 104. Additionally or alternatively, issuer system 104 may generate at least one settlement message based on the clearing message(s). Additionally or alternatively, issuer system 104 may communicate the settlement message(s) and/or funds to transaction service provider system 102 (and/or a settlement bank system associated with transaction service provider system 102). Additionally or alternatively, transaction service provider system 102 (and/or the settlement bank system) may communicate the settlement message(s) and/or funds to acquirer system 110, which may communicate the settlement message(s) and/or funds to merchant system 108 (and/or an account associated with merchant system 108).

The number and arrangement of systems, devices, and/or networks shown in FIG. 1B are provided as an example. There may be additional systems, devices, and/or networks; fewer systems, devices, and/or networks; different systems, devices, and/or networks; and/or differently arranged systems, devices, and/or networks than those shown in FIG. 1B. Furthermore, two or more systems or devices shown in FIG. 1B may be implemented within a single system or device, or a single system or device shown in FIG. 1B may be implemented as multiple, distributed systems or devices. Additionally or alternatively, a set of systems (e.g., one or more systems) or a set of devices (e.g., one or more devices) of environment 100b may perform one or more functions described as being performed by another set of systems or another set of devices of environment 100b.

Figure 2:
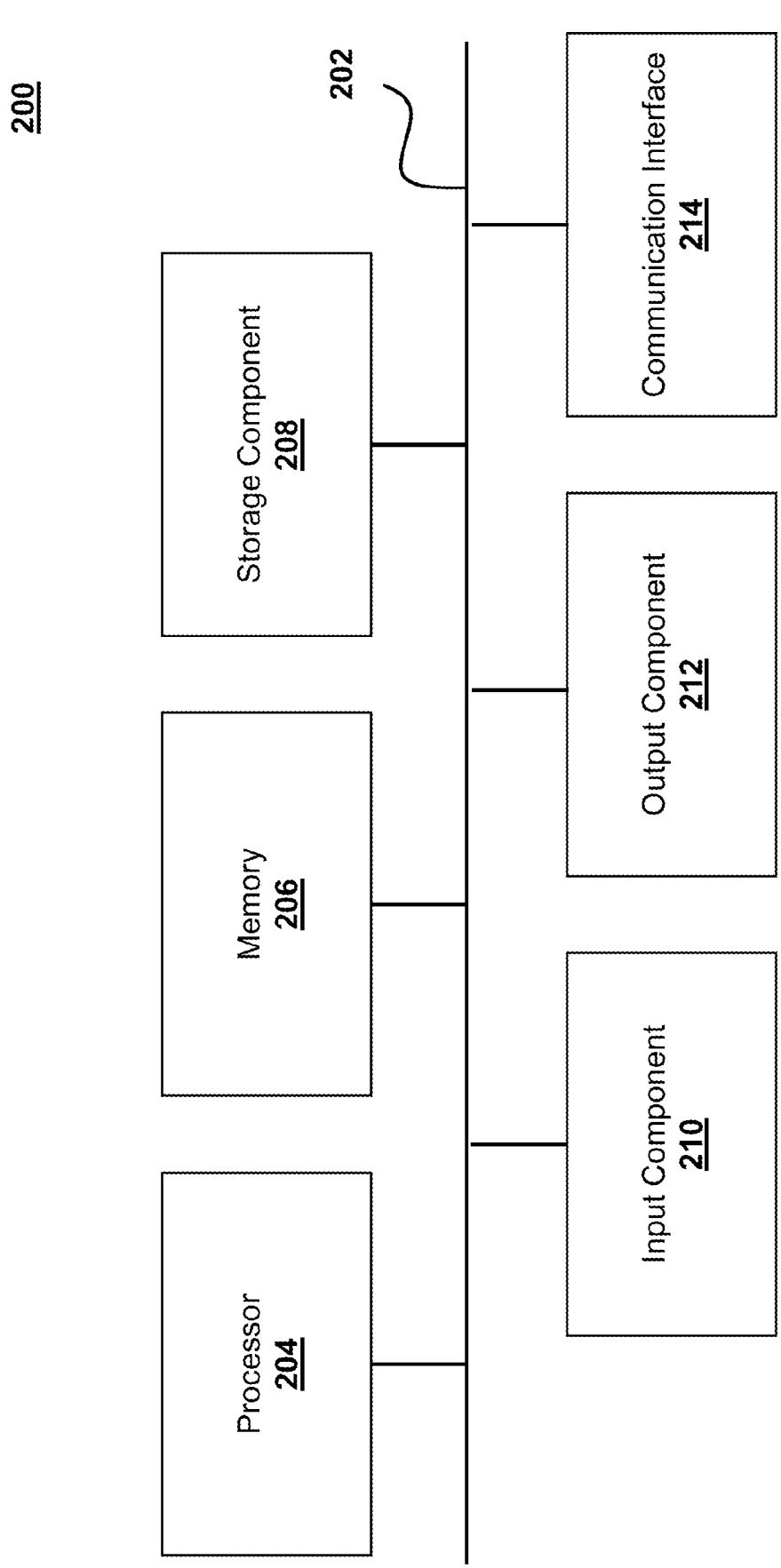
FIG. 2 is a diagram of exemplary components of one or more devices of FIGS. 1A and 1B, according to some non-limiting embodiments or aspects of the presently disclosed subject matter.

Referring now to FIG. 2, FIG. 2 is a diagram of example components of a device 200. Device 200 may correspond to one or more devices of transaction service provider system 102, embedding normalization/alignment system 102a, embedding database 102b, one or more devices of issuer system 104, customer device 106, requesting system 106a, one or more devices of merchant system 108, and/or one or more devices of acquirer system 110. In some non-limiting embodiments or aspects, transaction service provider system 102, embedding normalization/alignment system 102a, embedding database 102b, issuer system 104, customer device 106, requesting system 106a, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
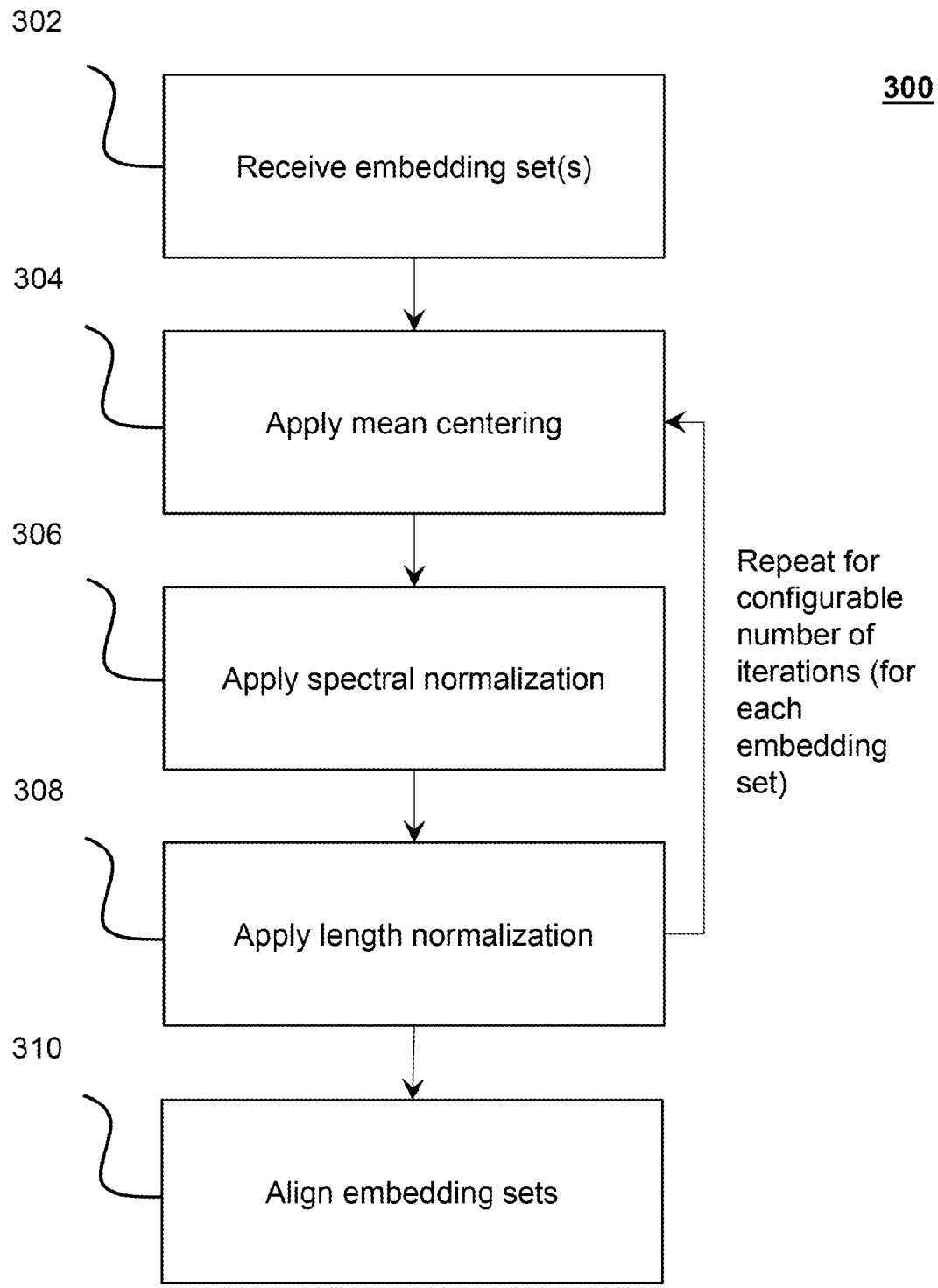
FIG. 3 is a flowchart of an exemplary process for normalizing embeddings for cross-embedding alignment, according to some non-limiting embodiments or aspects of the presently disclosed subject matter.

Referring now to FIG. 3, FIG. 3 is a flowchart of an exemplary process 300 for normalizing embeddings for cross-embedding alignment, according to some non-limiting embodiments or aspects. In some non-limiting embodiments or aspects, one or more of the steps of process 300 may be performed (e.g., completely, partially, and/or the like) by embedding normalization/alignment system 102a and/or transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including embedding normalization/alignment system 102a and/or transaction service provider system 102, such as embedding database 102b, issuer system 104 (e.g., one or more devices of issuer system 104), customer device 106, requesting system 106a (e.g., one or more devices of requesting system 106a), merchant system 108 (e.g., one or more devices of merchant system 108), acquirer system 110 (e.g., one or more devices of acquirer system 110), device 200, a computing device, a server, and/or the like.

As shown in FIG. 3, at step 302, process 300 may include receiving at least one embedding set. For example, embedding normalization/alignment system 102a (e.g., a server, a part of transaction service provider system 102, a part of a third-party system, and/or the like) may receive at least one embedding set. In some non-limiting embodiments or aspects, embedding normalization/alignment system 102a may receive the at least one embedding set from at least one of embedding database 102b and/or requesting system 106a. For example, embedding database 102b may receive the at least one embedding set from requesting system 106a, and/or embedding normalization/alignment system 102a may receive the at least one embedding set from embedding database 102b. Additionally or alternatively, embedding normalization/alignment system 102a may receive the at least one embedding set from requesting system 106a.

In some non-limiting embodiments or aspects, each embedding set may include a set of embedding vectors.

In some non-limiting embodiments or aspects, the at least one embedding set may include a first language embedding set and a second language embedding set. The first language embedding set may include a first set of word embedding vectors for a first language. Additionally or alternatively, the second language embedding set may include a second set of word embedding vectors for a second language.

In some non-limiting embodiments or aspects, the at least one embedding set may include a first embedding set representing an entity in a first embedding space associated with a first time period and a second embedding set representing the entity in a second embedding space associated with a second time period different than the first time period. In some non-limiting embodiments or aspects, the entity may include at least one of a merchant, a customer (e.g., cardholder), an issuer, an acquirer, or a payment gateway.

As shown in FIG. 3, at step 304, process 300 may include applying mean centering. For example, embedding normalization/alignment system 102a (e.g., a server, a part of transaction service provider system 102, a part of a third-party system, and/or the like) may apply mean centering to the at least one embedding set.

In some non-limiting embodiments or aspects, applying mean centering may include determining a mean based on all embedding vectors of the set of embedding vectors. Additionally or alternatively, the mean may be subtracted from each embedding vector of the set of embedding vectors.

In some non-limiting embodiments or aspects, embedding normalization/alignment system 102a may apply geometric median normalization. For example, applying geometric median normalization may include determining (e.g., by embedding normalization/alignment system 102a) a geometric median ($x^*$) based on the embedding set and/or normalizing (e.g., by embedding normalization/alignment system 102a) each embedding vector of the embedding set based on the geometric median ($x^*$). For example, determining the geometric median may include inputting the embedding set into a Weiszfeld algorithm to determine the geometric mean. Additionally or alternatively, normalizing each embedding vector may include replacing each respective embedding vector with a respective modified embedding vector determined based on subtracting the geometric median ($x^*$) from the respective embedding vector to provide a respective difference and dividing the difference by a magnitude (e.g., vector magnitude) of the difference. For the purpose of illustration, applying geometric median normalization may include applying the following algorithm, where A is an embedding set, as is an ith embedding vector of the embedding set A, $x^*$ is a geometric median, and Weiszfeld( ) is a Weiszfeld algorithm:

Algorithm 1
1: $x^* \leftarrow$ Weiszfeld(A)
2: for all $a_i \in A$ do $$a_i \leftarrow \frac{a_i - x^*}{\|a_i - x^*\|}$$

3: return A

For the purpose of illustration and not limitation, a Weiszfeld algorithm may include applying the following algorithm, where as is an ith embedding vector of the embedding set A (e.g., $a_1$ through $a_n$), $x_0$ is a starting point, $x_k$ is the value of x for the kth iteration, T( ) is equation 1, and $x_{k+1}$ is determined based on equation 2:

Algorithm 2
Input: Anchor points, $(a_1, \ldots a_n)$, $x_0 \in R^d$ and $\in > 0$
1: $k \leftarrow 0$
2: while True do
3: $x_{k+1} \leftarrow T(x_k)$
4: if $\|x_{k+1} - x_k\|_2 \leq \in$ then
5: return $x_{k+1}$
6: $k \leftarrow k+1$ Equation 1

$$T(x) = \begin{cases} \tilde{T}(x) = \frac{\sum_{i=1}^{n} \|a_i - x\|^{-1} a_i}{\sum_{i=1}^{n} \|a_i - x\|^{-1}} & \text{if } x \notin \{a_1, \ldots a_n\} \\ a_i & \text{if } x = a_i, i = 1, \ldots, n \end{cases}$$

$$x_{k+1} = T(x_k), k \in N \quad \text{Equation 2}$$

In some non-limiting embodiments or aspects, applying geometric median normalization may be in addition to or in lieu of applying mean centering.

As shown in FIG. 3, at step 306, process 300 may include applying spectral normalization. For example, embedding normalization/alignment system 102a (e.g., a server, a part of transaction service provider system 102, a part of a third-party system, and/or the like) may apply spectral normalization to the at least one embedding set.

In some non-limiting embodiments or aspects, applying spectral normalization to the at least one embedding set may include decomposing the at least one embedding set to provide a left singular vector, a right singular vector, and a diagonal matrix. For example, decomposing the at least one embedding set may include performing singular value decomposition (SVD) on the at least one embedding set.

In some non-limiting embodiments or aspects, an average singular value of the at least one embedding set may be determined. For example, determining the average singular value may include determining a square root of an average squared singular value.

In some non-limiting embodiments or aspects, for each respective singular value of the diagonal matrix, whether the respective singular value is greater than a configurable multiple of the average singular value may be determined.

In some non-limiting embodiments or aspects, if a respective singular value is greater than the configurable multiple of the average singular value, a respective substitute singular value may be determined based on a quotient of the respective singular value divided by the configurable multiple of the average singular value. Additionally or alternatively, if a respective singular value is not greater than the configurable multiple of the average singular value, the respective substitute singular value may be determined to be a configurable value (e.g., 1, a predetermined integer, a predetermined value, and/or the like). In some non-limiting embodiments or aspects, a substitute diagonal matrix may include the respective substitute singular value for each respective singular value of the diagonal matrix. In some non-limiting embodiments or aspects, the at least one embedding set may be replaced with a product of the at least one embedding set, the right singular vector, and an inverse of the substitute diagonal matrix.

In some non-limiting embodiments or aspects, for the purpose of illustration, applying spectral normalization may include applying the following algorithm, where A is an embedding set, svd( ) is a singular value decomposition function, U is a left singular vector, V is a right singular vector, $\Sigma$ is a diagonal matrix, T is the transpose operator, $\eta$ is an average singular value, D is a (substitute) diagonal matrix, d is the dimension of the embedding vectors, $\|A\|_F$ is the Frobenius norm of embedding set A, and $\beta$ is a parameter (e.g., hyperparameter, selectable parameter, and/or the like) used to determine the configurable multiple of the average singular value:

Algorithm 3
1: Compute svd(A)=$U\Sigma V^T$; Let D∈$R^d$ be a diagonal matrix.
2: Compute $\eta = \sqrt{\|A\|_F^2/d}$, where d is the dimension of the word embedding
3: for i=1, . . . , d do
4: if ($\Sigma_{ii}$>$\beta\eta$) then $D_{ii} \leftarrow \Sigma_{ii}/(\beta\eta)$
5: else $D_{ii}$=1
6: return $AVD^{-1}$ For example, if a respective singular value (e.g., $\Sigma_{ii}$) is greater than the configurable multiple of the average singular value (e.g., $\beta\eta$), a respective substitute singular value (e.g., $D_{ii}$) may be determined based on a quotient of the respective singular value divided by the configurable multiple of the average singular value (e.g., $\Sigma_{ii}/(\beta\eta)$). Additionally or alternatively, if a respective singular value (e.g., $\Sigma_{ii}$) is not greater than the configurable multiple of the average singular value (e.g., $\beta\eta$), the respective substitute singular value (e.g., $D_{ii}$) may be determined to be a configurable value (e.g., 1, a predetermined integer, a predetermined value, and/or the like).

As shown in FIG. 3, at step 308, process 300 may include applying length normalization. For example, embedding normalization/alignment system 102a (e.g., a server, a part of transaction service provider system 102, a part of a third-party system, and/or the like) may apply length normalization to the at least one embedding set.

In some non-limiting embodiments or aspects, applying length normalization may include adjusting each embedding vector of the set of embedding vectors to have a 2-norm (e.g., Euclidean norm) of 1.

In some non-limiting embodiments or aspects, as shown in FIG. 3, steps 304, 306, and 308 may be repeated for a configurable number of iterations. For example, embedding normalization/alignment system 102a (e.g., a server, a part of transaction service provider system 102, a part of a third-party system, and/or the like) may iteratively repeat applying mean centering, applying spectral normalization, and applying length normalization to the at least one embedding set for a configurable number of iterations.

In some non-limiting embodiments or aspects, for the purpose of illustration, iteratively repeating may include applying the following algorithm, where m is a configurable number of iterations, A is an embedding set, Center is mean centering, SpecNorm is spectral normalization, and Unit Length Normalization is length normalization, as described herein:

Algorithm 4
1: for m steps do
2: A←Center A
3: A←SpecNorm (A)
4: A←Unit length normalization of A
5: return A In some non-limiting embodiments or aspects, the parameters may be tuned. For example, the parameter $\beta$ used to determine the configurable multiple of the average singular value and/or the parameter m for the configurable number of iterations may be tuned (e.g., by embedding normalization/alignment system 102a) to at least one of avoid overfitting, improve performance, any combination thereof, and/or the like. For the purpose of illustration, Table 1 shows the mean average precision (MAP) achieved using different values of the parameter 13 (e.g., 1, 2, 3, 4, and 5) and the parameter m (e.g., 1, 2, 3, 4, and 5) for Procrustes alignment based on ten exemplary language pairs (e.g., English to another language or another language to English):

TABLE 1

|   | m = 1 | m = 2 | m = 3 | m = 4 | m = 5 |
|---|---|---|---|---|---|
| $\beta$ = 1 | 0.363 | 0.340 | 0.328 | 0.322 | 0.317 |
| $\beta$ = 2 | 0.385 | 0.386 | 0.386 | 0.386 | 0.386 |
| $\beta$ = 3 | 0.381 | 0.384 | 0.384 | 0.384 | 0.384 |
| $\beta$ = 4 | 0.381 | 0.382 | 0.382 | 0.382 | 0.382 |
| $\beta$ = 5 | 0.380 | 0.381 | 0.381 | 0.381 | 0.381 |

For the purpose of illustration, Table 2 shows the average Spearman rank coefficient score for a monolingual word similarity task using no normalization (e.g., none) and the disclosed techniques with different values of the parameter $\beta$ and the parameter m:

TABLE 2

| None | $\beta$ = 2, m = 2 | $\beta$ = 2, m = 3 | $\beta$ = 2, m = 4 | $\beta$ = 2, m = 5 |
|---|---|---|---|---|
| 0.651 | 0.67077 | 0.67101 | 0.67108 | 0.67111 |

As shown in FIG. 3, at step 310, process 300 may include aligning embedding sets. For example, the at least one embedding set may include a first embedding set and a second embedding set, and embedding normalization/alignment system 102a (e.g., a server, a part of transaction service provider system 102, a part of a third-party system, and/or the like) may align the first embedding set with the second embedding set.

In some non-limiting embodiments or aspects, aligning embedding sets may include applying at least one cross-lingual word embeddings (CLWE) alignment model. For example, the CLWE alignment model(s) may include at least one of a Procrustes model, a Bootstrap Procrustes (PROC-B) model, a multilingual unsupervised and supervised embeddings (MUSE) model, a canonical correlation analysis (CCA) model, a discriminative latent variable (DLV) model, a ranking-based optimization model, a cross-domain similarity local scaling (CSLS) model, a relaxed cross-domain similarity local scaling (RCSLS) model, a VEC-MAP model, a supervised alignment model, an unsupervised alignment model, a semi-supervised alignment model, any combination thereof, and/or the like.

In some non-limiting embodiments or aspects, aligning embedding sets may include applying at least one CLWE alignment model even if the embedding sets do not represent languages. For example, the at least one embedding set may include a first embedding set representing an entity (e.g., a merchant, a customer/cardholder, an issuer, an acquirer, a payment gateway, or the like) in a first embedding space associated with a first time period and a second embedding set representing the entity in a second embedding space associated with a second time period different than the first time period. In some non-limiting embodiments or aspects, one or more CLWE alignment models (e.g., one or more of the exemplary CLWE alignment models listed above) may be used (e.g., by embedding normalization/alignment system 102a) to align such non-language-based embedding sets, e.g., by treating each embedding set as if it were a language and treating each embedding vector of each embedding set as if it were a word of the respective language.

Figure 4A:
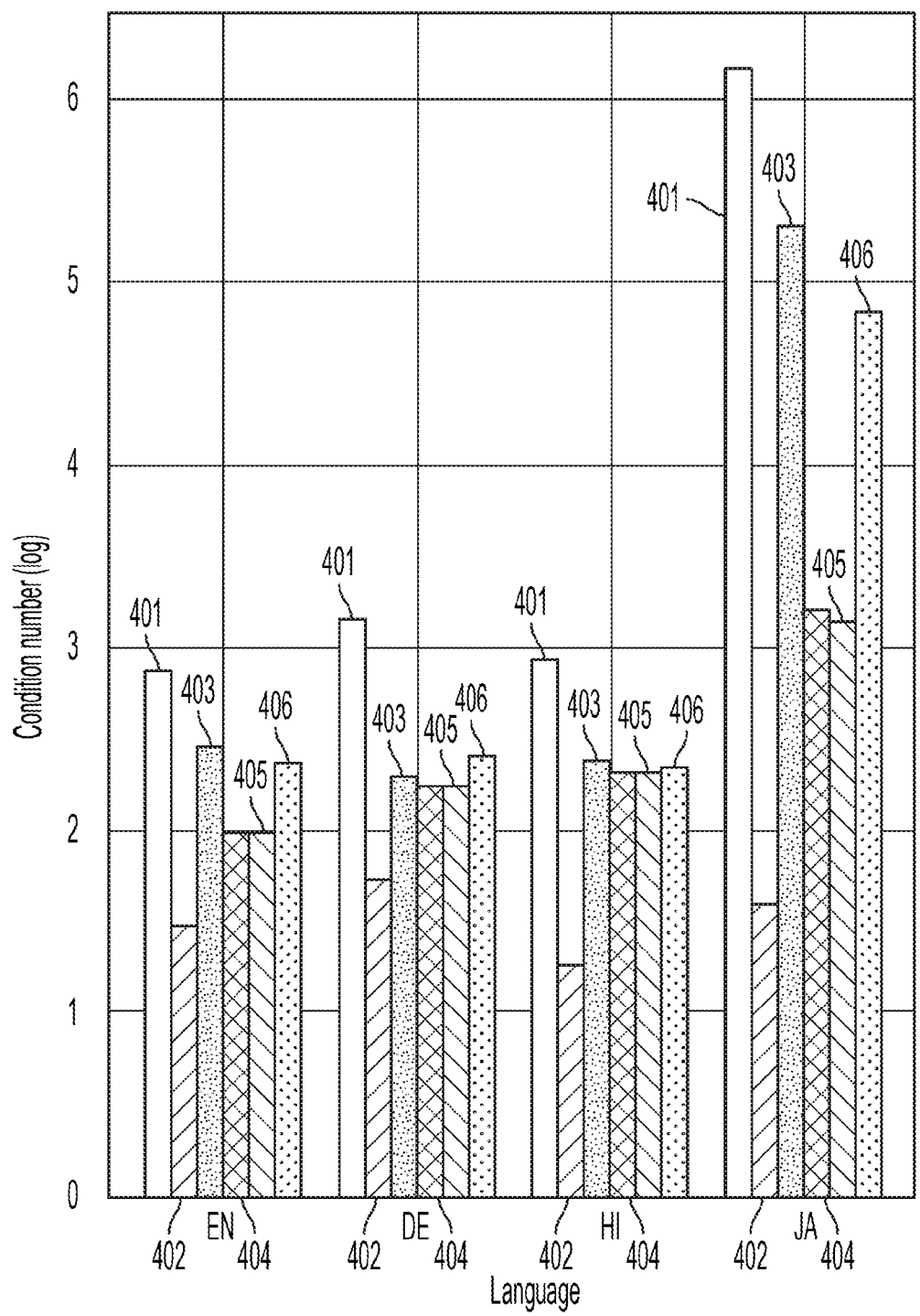
FIGS. 4A-4C are graphs showing performance of exemplary implementations of the process of FIG. 3, according to some non-limiting embodiments or aspects of the presently disclosed subject matter.
Figure 4B:
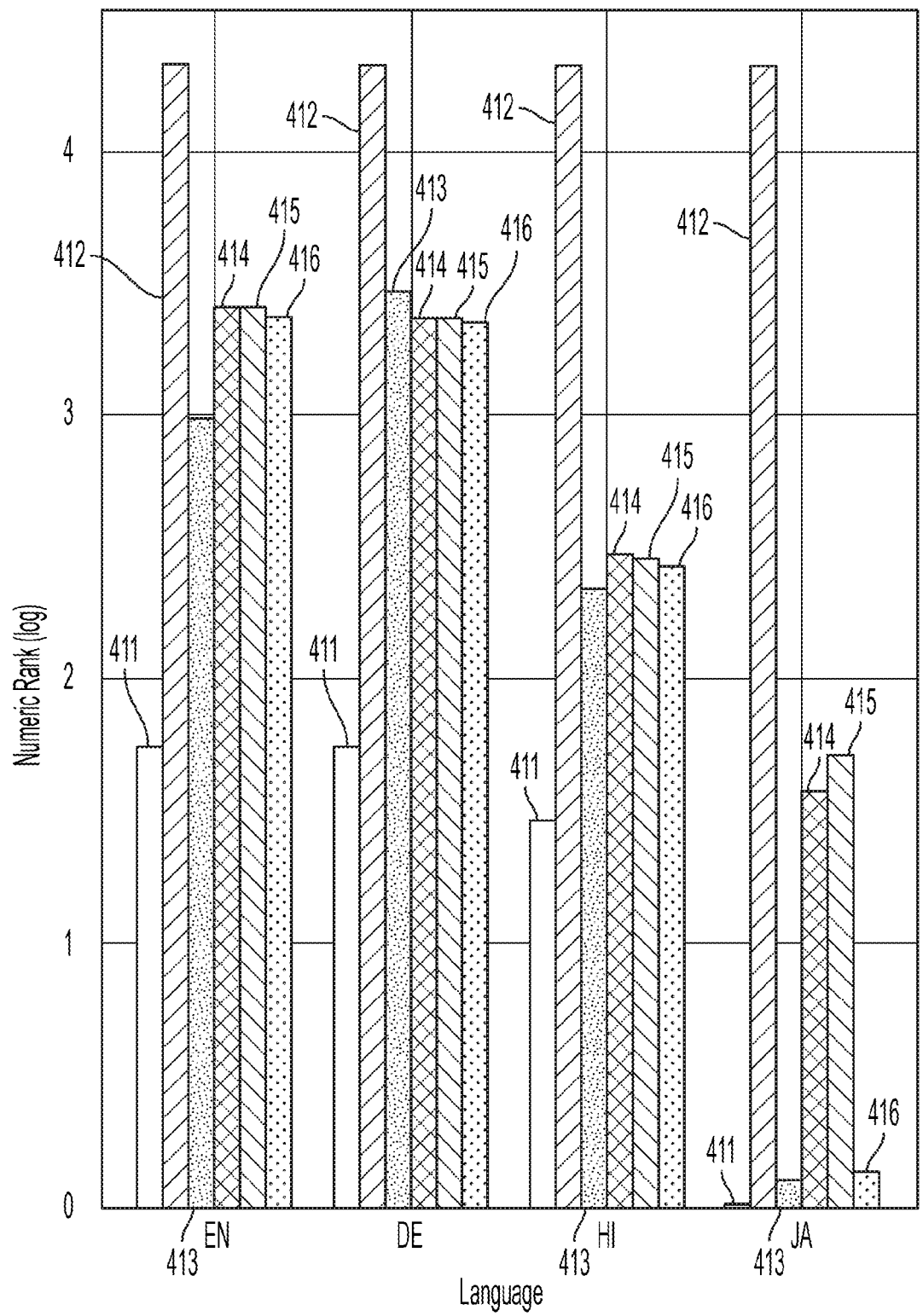
Figure 4C:
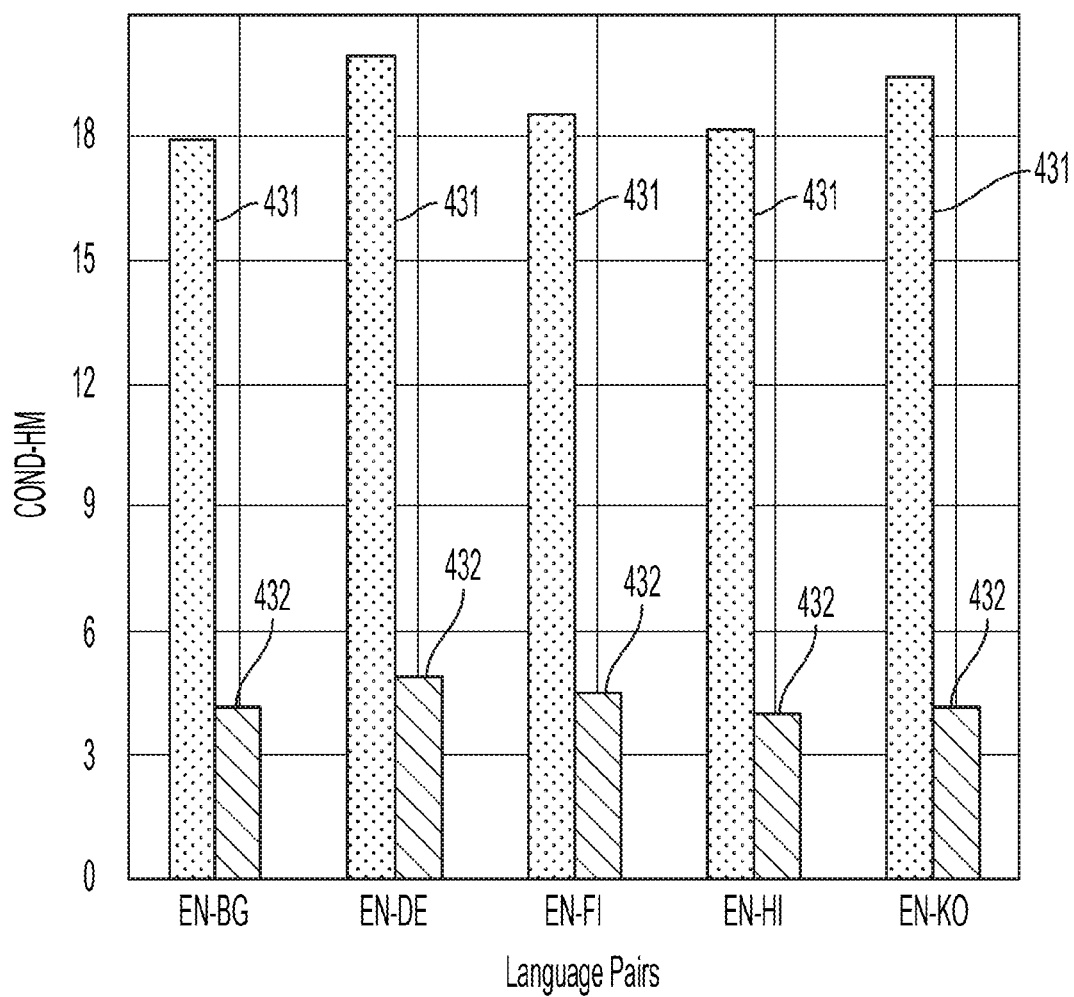

Referring now to FIGS. 4A-4C, FIGS. 4A-4C are bar graphs 400a, 400b, 400c showing performance of exemplary implementations of the process of FIG. 3, according to some non-limiting embodiments or aspects.

As shown in FIG. 4A, the vertical axis may represent condition number, and the horizontal axis may include categories for the following four exemplary languages: English (EN), German (DE), Hindi (HI), and Japanese (JA). For each exemplary language, the condition number is represented by a respective bar for each of the following pre-processing techniques: no normalization 401 (e.g., None), iterative mean centering and spectral normalization and length normalization 402 (e.g., I–C+SN+L, which may be shorthand for the iterative combination of mean centering (C), spectral normalization (SN), and length normalization (L), as described herein), PCA removal 403 (e.g., PR), mean centering and length normalization 404 (e.g., C+L, which may be a single round/not iterative), iterative mean centering and length normalization 405 (e.g., I–C+L, which may be multiple (e.g., 5) rounds of iteration), and geometric median 406 (e.g., GeoMedian). Notably, the condition number for iterative mean centering and spectral normalization and length normalization 402 (e.g., I–C+SN+L) is less than each of the other techniques for all four exemplary languages, demonstrating improved performance.

As shown in FIG. 4B, the vertical axis may represent numeric rank, and the horizontal axis may include categories for the following four exemplary languages: English (EN), German (DE), Hindi (HI), and Japanese (JA). For each exemplary language, the numeric rank is represented by a respective bar for each of the following pre-processing techniques: no normalization 411 (e.g., None), iterative mean centering and spectral normalization and length normalization 412 (e.g., I–C+SN+L, which may be shorthand for the iterative combination of mean centering (C), spectral normalization (SN), and length normalization (L), as described herein), PCA removal 413 (e.g., PR), mean centering and length normalization 414 (e.g., C+L, which may be a single round/not iterative), iterative mean centering and length normalization 415 (e.g., I–C+L, which may be multiple (e.g., 5) rounds of iteration), and geometric median 416 (e.g., GeoMedian). Notably, the numeric rank for iterative mean centering and spectral normalization and length normalization 402 (e.g., I–C+SN+L) is greater than each of the other techniques for all four exemplary languages, demonstrating improved performance.

As shown in FIG. 4C, the vertical axis may represent joint condition number, and the horizontal axis may include categories for the following five exemplary language pairs (e.g., for translation from a first language to a second language): English to Bulgarian (EN-BG), English to German (EN-DE), English to Finnish (EN-FI), English to Hindi (EN-HI), and English to Korean (EN-KO). For each exemplary language pair, the condition number is represented by a respective bar for each of the following pre-processing techniques: no normalization 431 (e.g., None) and iterative mean centering and spectral normalization and length normalization 432 (e.g., I–C+SN+L). Notably, the joint condition number for iterative mean centering and spectral normalization and length normalization 402 (e.g., I–C+SN+L) is decreased compared to no normalization, demonstrating improved performance.

Figure 5A:
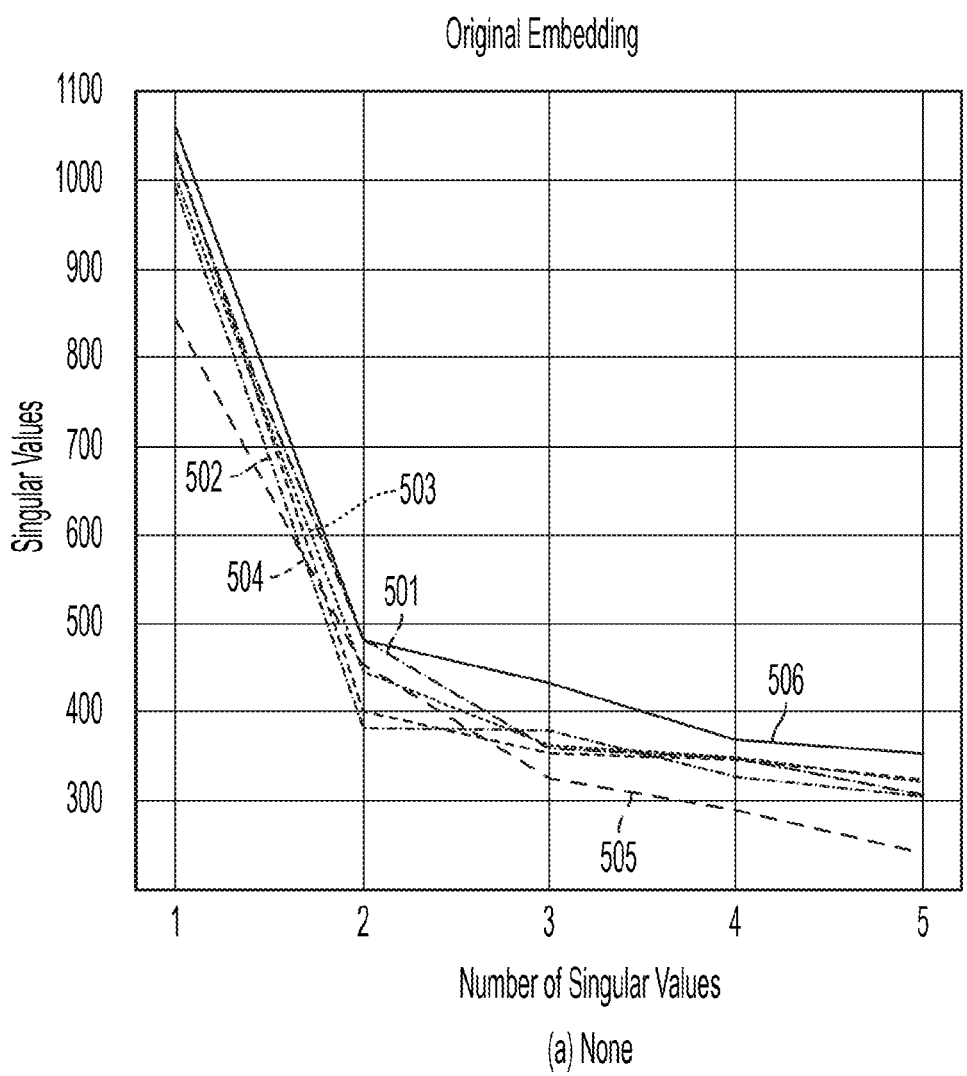
FIGS. 5A and 5B are graphs showing performance of exemplary implementations of the process of FIG. 3, according to some non-limiting embodiments or aspects of the presently disclosed subject matter.
Figure 5B:
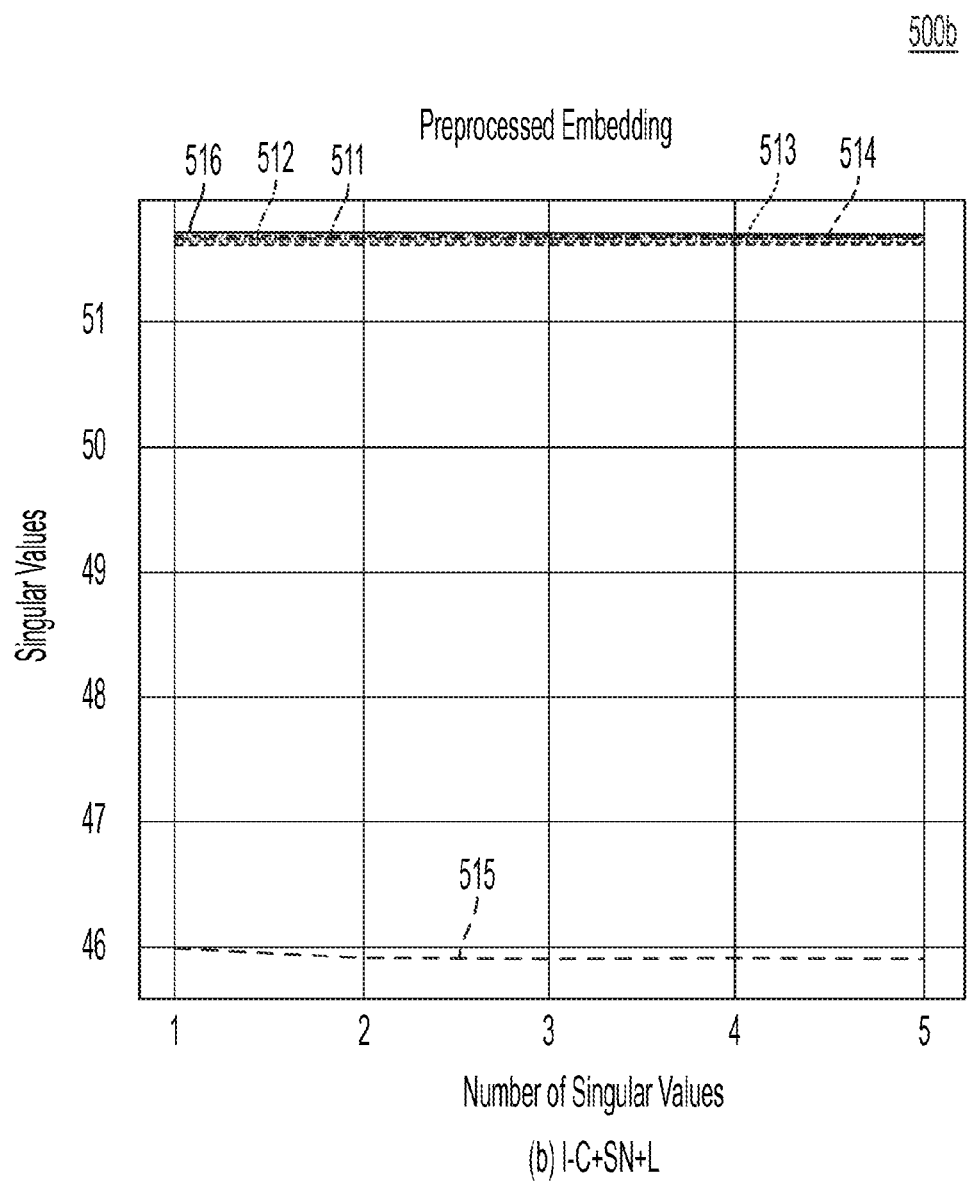

Referring now to FIGS. 5A and 5B, FIGS. 5A and 5B are line graphs 500a, 500b showing performance of exemplary implementations of the process of FIG. 3, according to some non-limiting embodiments or aspects.

As shown in each of FIGS. 5A and 5B, the vertical axis may represent singular values, and the horizontal axis may represent the number of singular values. Notably, the scale of the vertical axis for graph 500b in FIG. 5B is narrower than the scale of the vertical axis for graph 500a in FIG. 5A, and the maximum value for the vertical axis for graph 500b in FIG. 5B is less than the maximum value for the vertical axis for graph 500a in FIG. 5A.

As shown in FIG. 5A, there are lines for singular values with respect to the number of singular values without using a normalization technique (e.g., None) for each of the following exemplary languages: Bulgarian (BG) 501, German (DE) 502, English (EN) 503, Finnish (FI) 504, Hindi (HI) 505, and Korean (KO) 506. For each of these lines, the singular values are steeply decaying as the number of singular values increases. As such, aligning these languages without using a normalization technique would likely result in forced alignment based on the top singular values due to the clustering of words, whether or not the words in those clusters actually aligned.

As shown in FIG. 5B, there are lines for singular values with respect to the number of singular values after applying iterative mean centering and spectral normalization and length normalization (e.g., I–C+SN+L) for each of the following exemplary languages: Bulgarian (BG) 511, German (DE) 512, English (EN) 513, Finnish (FI) 514, Hindi (HI) 515, and Korean (KO) 516. For each of these lines, the singular values are relatively uniform as the number of singular values increases. As such, an alignment model (e.g., CLWE alignment model) would have more freedom to align actually matching words without the burden of clustering described above with respect to not using a normalization technique.

For the purpose of illustration, Table 3 shows the MAP achieved using different pre-processing techniques (no normalization (None), PCA removal (PR), geometric median (GeoMedian), mean centering and length normalization (C+L), iterative mean centering and length normalization (I–C+L, 5 iterations), mean centering and spectral normalization and length normalization (C+SN+L), and iterative mean centering and spectral normalization and length normalization (I–C+SN+L, 5 iterations)) for bilingual lexicon induction (BLI) based on eighteen exemplary language pairs (e.g., English to and from each of the following: Bulgarian (BG), Catalan (CA), Czech (CS), German (DE), Spanish (ES), French (FR), Korean (KO), Thai (TH), and Chinese (ZH)) using three different CLWE alignment models (CCA, PROC, and PROC-B):

TABLE 3

| Normalization | English to Other Languages | | | Other Languages to English | | |
|---|---|---|---|---|---|---|
| | CCA | PROC | PROC-B | CCA | PROC | PROC-B |
| None | 0.358 | 0.365 | 0.377 | 0.398 | 0.399 | 0.405 |
| PR | 0.394 | 0.391 | 0.404 | 0.434 | 0.430 | 0.442 |
| GeoMedian | 0.393 | 0.391 | 0.400 | 0.433 | 0.432 | 0.440 |
| C + L | 0.393 | 0.394 | 0.408 | 0.439 | 0.437 | 0.445 |
| I-C + L | 0.394 | 0.395 | 0.410 | 0.439 | 0.438 | 0.448 |
| C + SN + L | 0.394 | 0.396 | 0.413 | 0.444 | 0.444 | 0.458 |
| I-C + SN + L | 0.396 | 0.398 | 0.414 | 0.445 | 0.446 | 0.461 |

For the purpose of illustration, Table 4 shows the MAP achieved using different pre-processing techniques (no normalization (None) and iterative mean centering and spectral normalization and length normalization (ICSNL)) for BLI based on 28 language pairs using five different CLWE alignment models (CCA, PROC, PROC-B, DLV, and RCSLS) for dictionary sizes of 1,000 (1 K), 3,000 (3 K), and 5,000 (5 K) words:

TABLE 4

| Dict. | CCA None | CCA ICSNL | PROC None | PROC ICSNL | PROC-B None | PROC-B ICSNL | DLV None | DLV ICSNL | RCSLS None | RCSLS ICSNL |
|---|---|---|---|---|---|---|---|---|---|---|
| 1K | .289 | .314 | .299 | .326 | .379 | .407 | .289 | .332 | .331 | .331 |
| 3K | .378 | .401 | .384 | .408 | .398 | .415 | .381 | .429 | .415 | .427 |
| 5K | .400 | .423 | .405 | .429 | — | — | .403 | .452 | .437 | .460 |

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
receiving, with at least one processor, at least one embedding set, each embedding set of the at least one embedding set comprising a set of embedding vectors;
applying, with at least one processor, mean centering to the at least one embedding set;
applying, with at least one processor, spectral normalization to the at least one embedding set, wherein applying spectral normalization to the at least one embedding set comprises:
decomposing, with at least one processor, the at least one embedding set to provide a left singular vector, a right singular vector, and a diagonal matrix;
determining, with at least one processor, an average singular value of the at least one embedding set;
for each respective singular value of the diagonal matrix, determining, with at least one processor, whether the respective singular value is greater than a configurable multiple of the average singular value;
for each respective singular value of the diagonal matrix, if the respective singular value is greater than the configurable multiple of the average singular value, determining, with at least one processor, a respective substitute singular value based on a quotient of the respective singular value divided by the configurable multiple of the average singular value or, if the respective singular value is not greater than the configurable multiple of the average singular value, determining, with at least one processor, the respective substitute singular value to be 1, wherein a substitute diagonal matrix comprises the respective substitute singular value for each respective singular value of the diagonal matrix; and
replacing, with at least one processor, the at least one embedding set with a product of the at least one embedding set, the right singular vector, and an inverse of the substitute diagonal matrix; and
applying, with at least one processor, length normalization to the at least one embedding set.

2. The method of claim 1, wherein applying mean centering comprises:
determining, with at least one processor, a mean based on all embedding vectors of the set of embedding vectors; and
subtracting, with at least one processor, the mean from each embedding vector of the set of embedding vectors.

3. The method of claim 1, wherein decomposing the at least one embedding set comprises performing singular value decomposition on the at least one embedding set.

4. The method of claim 1, wherein determining the average singular value comprises determining a square root of an average squared singular value.

5. The method of claim 1, wherein applying length normalization comprises:
adjusting, with at least one processor, each embedding vector of the set of embedding vectors to have a 2-norm of 1.

6. The method of claim 1, further comprising:
iteratively repeating, with at least one processor, applying mean centering, applying spectral normalization, and applying length normalization to the at least one embedding set for a configurable number of iterations.

7. The method of claim 1, wherein the at least one embedding set comprises a first embedding set and a second embedding set, the method further comprising:
aligning, with at least one processor, the first embedding set with the second embedding set.

8. The method of claim 1, wherein the at least one embedding set comprises a first language embedding set and a second language embedding set, the first language embedding set comprising a first set of word embedding vectors for a first language, the second language embedding set comprising a second set of word embedding vectors for a second language.

9. The method of claim 1, wherein the at least one embedding set comprises a first embedding set representing an entity in a first embedding space associated with a first time period and a second embedding set representing the entity in a second embedding space associated with a second time period different than the first time period.

10. The method of claim 9, wherein the entity comprises at least one of a merchant, a customer, an issuer, an acquirer, or a payment gateway.

11. A system, comprising:

at least one processor; and at least one non-transitory computer-readable medium including one or more instructions that, when executed by the at least one processor, direct the at least one processor to:

receive at least one embedding set, each embedding set of the at least one embedding set comprising a set of embedding vectors;

apply mean centering to the at least one embedding set;

apply spectral normalization to the at least one embedding set, wherein applying spectral normalization to the at least one embedding set comprises:

decomposing the at least one embedding set to provide a left singular vector, a right singular vector, and a diagonal matrix;

determining an average singular value of the at least one embedding set;

for each respective singular value of the diagonal matrix, determining whether the respective singular value is greater than a configurable multiple of the average singular value;

for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and replacing the at least one embedding set with a product of the at least one embedding set, the right singular vector, and an inverse of the substitute diagonal matrix; and apply length normalization to the at least one embedding set.

12. The system of claim 11, wherein applying mean centering comprises:

determining a mean based on all embedding vectors of the set of embedding vectors; and subtracting the mean from each embedding vector of the set of embedding vectors.

13. The system of claim 11, wherein decomposing the at least one embedding set comprises performing singular value decomposition on the at least one embedding set.

14. The system of claim 11, wherein determining the average singular value comprises determining a square root of an average squared singular value.

15. The system of claim 11, wherein applying length normalization comprises:

adjusting each embedding vector of the set of embedding vectors to have a 2-norm of 1.

16. The system of claim 11, wherein the instructions, when executed by the at least one processor, further direct the at least one processor to:

iteratively repeat applying mean centering, applying spectral normalization, and applying length normalization to the at least one embedding set for a configurable number of iterations.

17. The system of claim 11, wherein the at least one embedding set comprises a first embedding set and a second embedding set, wherein the instructions, when executed by the at least one processor, further direct the at least one processor to:

align the first embedding set with the second embedding set.

18. The system of claim 11, wherein the at least one embedding set comprises a first language embedding set and a second language embedding set, the first language embedding set comprising a first set of word embedding vectors for a first language, the second language embedding set comprising a second set of word embedding vectors for a second language.

19. The system of claim 11, wherein the at least one embedding set comprises a first embedding set representing an entity in a first embedding space associated with a first time period and a second embedding set representing the entity in a second embedding space associated with a second time period different than the first time period, and wherein the entity comprises at least one of a merchant, a customer, an issuer, an acquirer, or a payment gateway.

20. A computer program product comprising at least one non-transitory computer-readable medium including one or more instructions that, when executed by at least one processor, cause the at least one processor to:

receive at least one embedding set, each embedding set of the at least one embedding set comprising a set of embedding vectors;

apply mean centering to the at least one embedding set;

apply spectral normalization to the at least one embedding set, wherein applying spectral normalization to the at least one embedding set comprises:

decomposing the at least one embedding set to provide a left singular vector, a right singular vector, and a diagonal matrix;

determining an average singular value of the at least one embedding set;

for each respective singular value of the diagonal matrix, determining whether the respective singular value is greater than a configurable multiple of the average singular value;

for each respective singular value of the diagonal matrix, if the respective singular value is greater than the configurable multiple of the average singular value, determining a respective substitute singular value based on a quotient of the respective singular value divided by the configurable multiple of the average singular value or, if the respective singular value is not greater than the configurable multiple of the average singular value, determining the respective substitute singular value to be 1, wherein a substitute diagonal matrix comprises the respective substitute singular value for each respective singular value of the diagonal matrix; and replacing the at least one embedding set with a product of the at least one embedding set, the right singular vector, and an inverse of the substitute diagonal matrix; and apply length normalization to the at least one embedding set.

* * * * *